US009663367B2

(12) United States Patent
Koveal, Jr. et al.

(10) Patent No.: US 9,663,367 B2
(45) Date of Patent: May 30, 2017

(54) REACTOR SYSTEM FOR THE PRODUCTION OF CARBON ALLOTROPES

(71) Applicants: ExxonMobil Upstream Research Company, Houston, TX (US); Solid Carbon Products LLC, Provo, UT (US)

(72) Inventors: Russell J. Koveal, Jr., Baton Rouge, LA (US); Terry A. Ring, Sandy, UT (US)

(73) Assignees: EXXON MOBIL UPSTREAM RESEARCH COMPANY, Houston, TX (US); SOLID CARBON PRODUCTS, LLC, Provo, UT (US)

( * ) Notice: Subject to any disclaimer, the term of this patent is extended or adjusted under 35 U.S.C. 154(b) by 0 days.

(21) Appl. No.: 14/428,589

(22) PCT Filed: Sep. 13, 2013

(86) PCT No.: PCT/US2013/059613
§ 371 (c)(1),
(2) Date: Mar. 16, 2015

(87) PCT Pub. No.: WO2014/046972
PCT Pub. Date: Mar. 27, 2014

(65) Prior Publication Data
US 2015/0246813 A1 Sep. 3, 2015

Related U.S. Application Data

(60) Provisional application No. 61/702,620, filed on Sep. 18, 2012.

(51) Int. Cl.
*C01B 31/02* (2006.01)
*B01J 8/18* (2006.01)
(Continued)

(52) U.S. Cl.
CPC .............. *C01B 31/02* (2013.01); *B01J 8/08* (2013.01); *B01J 8/1836* (2013.01); *B01J 8/24* (2013.01);
(Continued)

(58) Field of Classification Search
CPC ..... B82Y 30/00; B82Y 40/00; C01B 31/0233; C01B 31/024; C01B 31/02; B01J 8/24;
(Continued)

(56) References Cited

U.S. PATENT DOCUMENTS 6,905,544 B2 * 6/2005 Setoguchi .................. B01J 8/18
117/105
7,585,483 B2 9/2009 Edwin et al.
(Continued)

FOREIGN PATENT DOCUMENTS

CN 1431968 A 7/2003
CN 101959793 A 1/2011
(Continued)

OTHER PUBLICATIONS

Supplementary Partial European Search Report, EP 13839461, Mar. 17, 2016, 6 pps.
(Continued)

*Primary Examiner* — Daniel C McCracken
(74) *Attorney, Agent, or Firm* — International IP Law Group, P.L.L.C.

(57) ABSTRACT

Systems and a method for forming carbon allotropes are described. An exemplary reactor system for the production of carbon allotropes includes a hybrid reactor configured to form carbon allotropes from a reactant gas mixture in a Bosch reaction. The hybrid reactor includes at least two distinct zones that perform different functions including reaction, attrition, catalyst separation, or gas separation.

25 Claims, 15 Drawing Sheets

(51) Int. Cl.
  *B01J 8/08* (2006.01)
  *B01J 8/24* (2006.01)
  *B82Y 30/00* (2011.01)
  *B82Y 40/00* (2011.01)

(52) U.S. Cl.
  CPC .............. *B82Y 30/00* (2013.01); *B82Y 40/00* (2013.01); *C01B 31/024* (2013.01); *C01B 31/0233* (2013.01); *B01J 2208/00256* (2013.01); *B01J 2208/00752* (2013.01); *B01J 2208/00761* (2013.01); *B01J 2208/00893* (2013.01); *Y02P 20/129* (2015.11)

(58) Field of Classification Search
  CPC .. B01J 8/1836; B01J 8/08; B01J 2208/00761; B01J 2208/00256; B01J 2208/00893; B01J 2208/00752; Y02P 20/129
  USPC ........ 423/447.1–447.3, 445 B; 977/742–754, 977/842–848; 422/139, 187, 600
  See application file for complete search history.

(56) References Cited

U.S. PATENT DOCUMENTS

| | | |
|---|---|---|
| 2002/0131910 A1 | 9/2002 | Resasco et al. |
| 2002/0179489 A1 | 12/2002 | Choudhary et al. |
| 2005/0074392 A1 | 4/2005 | Yang et al. |
| 2005/0220695 A1 | 10/2005 | Abatzoglou et al. |
| 2010/0316556 A1 | 12/2010 | Wei et al. |
| 2011/0085961 A1 | 4/2011 | Noda et al. |
| 2012/0034150 A1 | 2/2012 | Noyes |
| 2014/0348739 A1 | 11/2014 | Denton |

FOREIGN PATENT DOCUMENTS

| | | | |
|---|---|---|---|
| CN | 102459727 A | | 5/2012 |
| JP | H10182121 A | | 7/1998 |
| WO | WO/2010/120581 | A1 | 10/2010 |
| WO | 2013/090444 | A1 | 6/2013 |
| WO | WO/2013/158437 | A1 | 10/2013 |
| WO | WO/2013/158438 | A1 | 10/2013 |
| WO | WO/2013/158439 | A2 | 10/2013 |
| WO | WO/2013/158440 | A1 | 10/2013 |
| WO | WO/2013/158441 | A1 | 10/2013 |

OTHER PUBLICATIONS

Notification of First Office Action, CN 201380042488.8, Apr. 5, 2016, 24 pps.

Karthikeyan, et al., Large Scale Synthesis of Carbon Nanotubes. E-Journal of Chemistry, 2009, 6(1), 1-12.

PCT International Search Report, dated Jan. 24, 2014, for PCT Application PCT/US13/35988, Filed Sep. 13, 2013.

Vander Wal, R.L., et al., Flame Synthesis of Single-Walled Carbon Nanotubes and Nanofibers. Seventh International Workshop on Microgravity Combustion and Chemically Reacting Systems, Aug. 2003, 73-76 (NASA Research Publication: NASA/CP-2003-212376/REV1).

Written Opinion of the International Search Authority, dated Jan. 24, 2014, for PCT Application PCT/US13/35988, Filed Sep. 13, 2013.

Australian Notification of Examiner's Objections, dated Jul. 10, 2015.

* cited by examiner

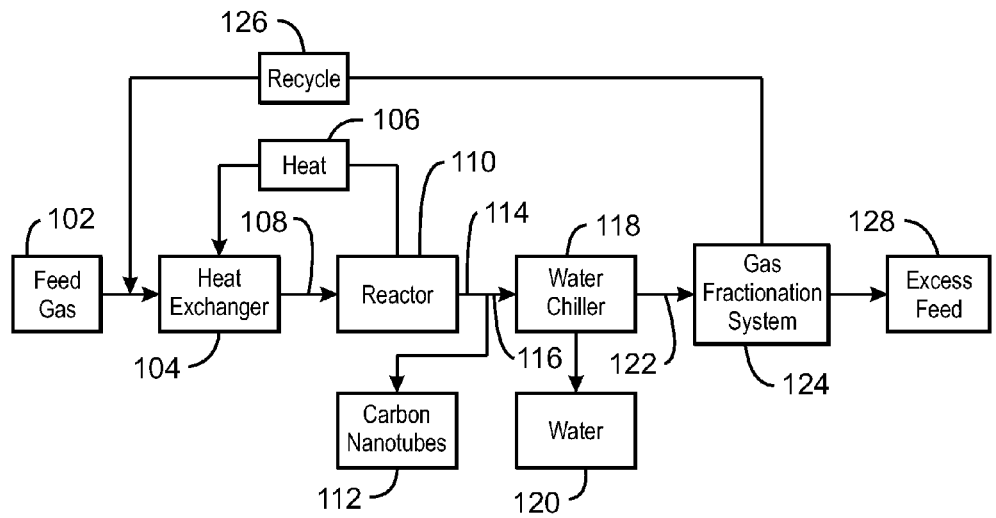
100
FIG. 1A
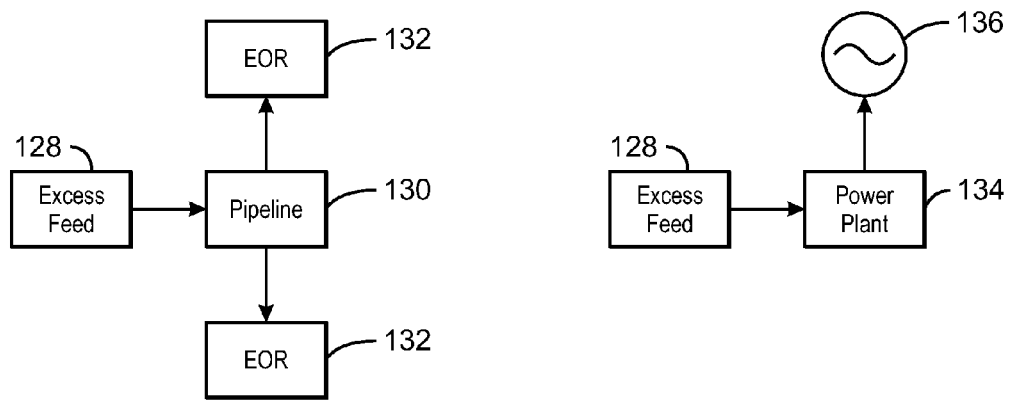
FIG. 1B
FIG. 1C

200

900

1100

1300

REACTOR SYSTEM FOR THE PRODUCTION OF CARBON ALLOTROPES

FIELD

The present techniques relate to an industrial scale process for forming carbon fibers and carbon nanomaterials.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon, i.e., carbon allotropes, have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils. Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recently developed carbon allotropes, such as fullerenes, are starting to be used in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/min. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors, is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman et al., U.S. Pat. No. 2,796,331, discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L. et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP—2003-212376/REV1). The technique used the introduction of a CO or $CO/C_2H_2$ mixture into a flame along with a catalyst to form the carbon nanotubes. The authors noted the high productivity that could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 ms.

International Patent Application Publication No. WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions and optional additives used in the reduction reaction. The process is conducted at a low pressure and uses a cryogenic chilling process to remove water from a feed stream.

While all of the techniques described can be used to form carbon allotropes, none of the processes provide a practical method for bulk or industrial scale production. Specifically, the amounts formed and the process efficiencies are both low.

SUMMARY

An embodiment described herein provides a reactor system for the production of carbon allotropes. The reactor system includes a hybrid reactor configured to form carbon allotropes from a reactant gas mixture in a Bosch reaction. The hybrid reactor includes at least two distinct zones that perform different functions including reaction, attrition, catalyst separation, or gas separation.

Another embodiment provides a method for forming carbon allotropes. The method includes injecting a reactant gas into a hybrid reactor, wherein the hybrid reactor includes at least two zones, and wherein each zone performs a function including reaction, catalyst separation, attrition, or gas separation. The reactant gas includes a carbon oxide and a hydrocarbon. Carbon allotropes are formed in the hybrid reactor using a Bosch reaction. Catalyst particles are separated from the reactant gas to form a waste gas stream and the carbon allotropes are separated from the waste gas stream.

Another embodiment provides a reaction system for forming carbon allotropes. The reaction system includes a hybrid reactor configured to form carbon allotropes from gas streams using a Bosch reaction, wherein the hybrid reactor includes at least two distinct functional zones. Each zone is configured to perform a function including reaction, attrition, catalyst separation, or gas separation. A separation system downstream of the hybrid reactor is configured to remove carbon allotropes from an effluent from the hybrid reactor. A feed heater is located downstream of the separation system, wherein the feed heater includes a heat exchanger configured to heat a feed gas stream for the hybrid reactor using waste heat from the effluent from the hybrid reactor. A heat exchanger is located downstream of the separation system, wherein the heat exchanger is configured to remove water from the effluent. A gas separation system is configured to separate the reactant depleted waste stream into a methane enriched stream and a carbon dioxide enriched stream and a mixer is configured to blend the methane enriched stream or the carbon dioxide enriched stream into an initial feed stream.

DESCRIPTION OF THE DRAWINGS

The advantages of the present techniques are better understood by referring to the following detailed description and the attached drawings, in which:

FIG. 1A is a block diagram of a reaction system that generates carbon allotropes, for example, as a by-product of a carbon dioxide sequestration reaction;

FIG. 1B is a block diagram of the use of an excess carbon dioxide feed in an enhanced oil recovery (EOR) process;

FIG. 1C is a block diagram of the use of an excess methane feed in a power generation process;

DETAILED DESCRIPTION

Figure 2:
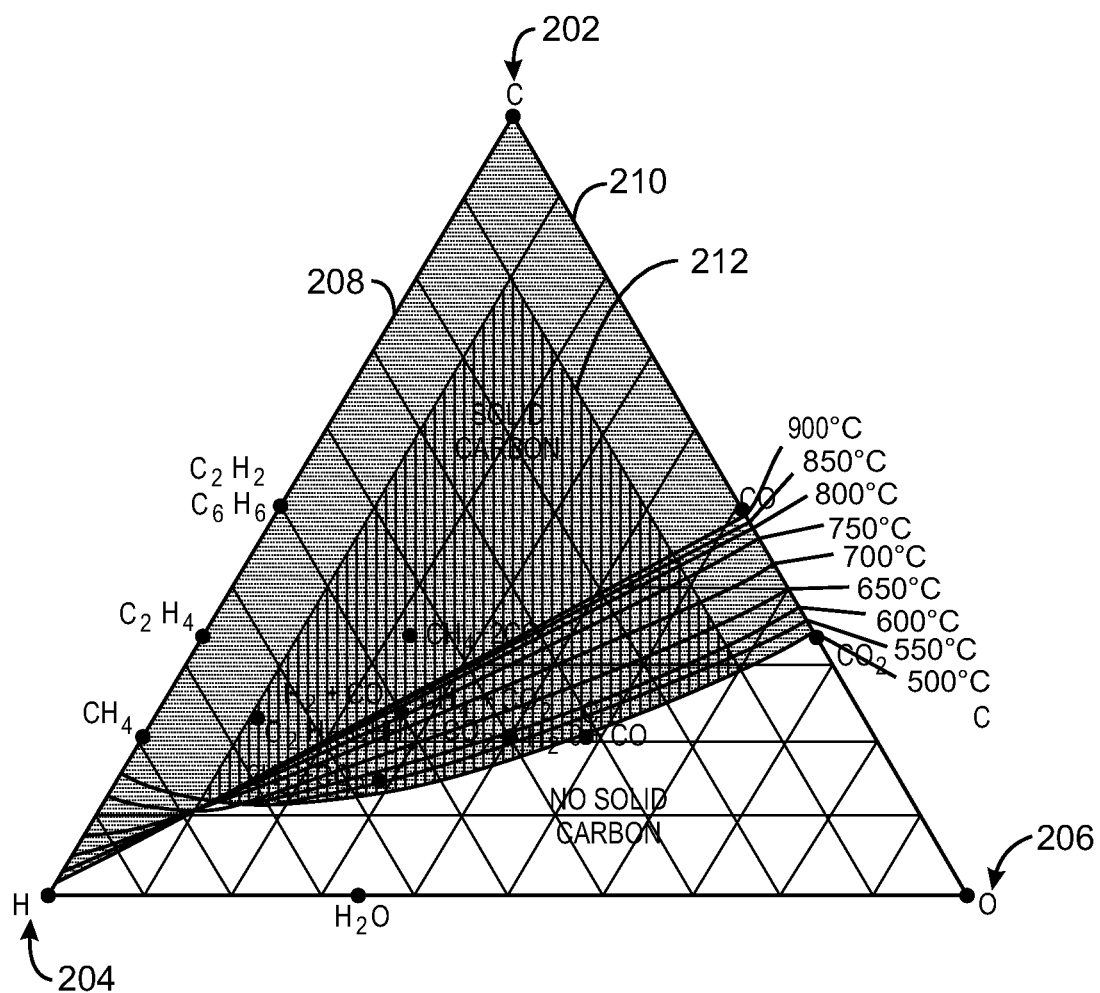
FIG. 2 is a C—H—O equilibrium diagram of the equilibria between carbon, hydrogen, and oxygen, indicating species in equilibrium at various temperature conditions.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "Buckminster fullerene." The walls of the carbon nanotubes are formed from sheets of carbon in a graphene structure. As used herein, nanotubes may include single wall nanotubes and multiple wall nanotubes of any length. It can be understood that the term "carbon allotropes" as used herein and in the claims, includes carbon fibers, carbon nanofibers, carbon nanotubes, other carbon nanostructures, and other allotropes of carbon.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

Overview

Embodiments described herein provide hybrid reactor systems for making carbon fibers, nanofibers, and nanotubes (CNTs) on an industrial scale using feedstocks that can include nearly stoichiometric mixtures of carbon dioxide and methane, among others. As used herein, a hybrid reactor includes one or more distinct zones, in which each zone performs a specific function, such as reaction, attrition, catalyst separation, or gas separation, or any combinations thereof. The hybrid reactors may include various combinations of packed beds, fluidized beds, and transport reactors. Further, the hybrid reactor systems may include multiple reactors in staged configurations. The hybrid reactor systems described herein can efficiently produce carbon allotropes, attrit carbon allotropes from catalyst particles, eliminate the need for downstream separation equipment to return catalyst particles to the reactor, and the like.

In some embodiments, feedstocks that are higher in $CH_4$ may be used, while in other embodiments, feedstocks used are higher in $CO_2$. Other feedstocks may be used, including mixtures of $H_2$, CO, $CO_2$, and other hydrocarbons. The process is conducted under high temperature and pressure conditions using a Bosch reaction, as discussed with respect to FIG. 2.

The process may be slightly exothermic, energy neutral, or slightly endothermic. Accordingly, at least a portion of the heat from the reaction can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. After separation of the product and water formed during the reaction, a gas separation system is used to separate any remaining amounts of the limiting reagent from a waste gas mixture and recycle this reagent to the process.

Embodiments described herein can be used to produce industrial quantities of carbon allotropes such as fullerenes, carbon nanotubes, carbon nanofibers, carbon fibers, graphite, carbon black, and graphene, among others, using carbon oxides as the primary carbon source. The balance of the possible products may be adjusted by the conditions used for the reaction, including catalyst compositions, temperatures, pressures, feedstocks, and the like. In a reactor system, the carbon oxides are catalytically converted to solid carbon and water. The carbon oxides may be obtained from numerous sources, including the atmosphere, combustion gases, process off-gases, well gas, and other natural and industrial sources. The reactor designs discussed with respect to FIGS. 6-11 will allow large scale production of carbon allotropes allowing large quantities to be produced. The large scale production can provide a more consistent product.

FIG. 1A is a block diagram of a reaction system 100 that generates carbon allotropes, for example, as a by-product of a carbon dioxide sequestration reaction. The reaction system 100 is provided a feed gas 102, which can be a mixture of $CO_2$ and $CH_4$. In some embodiments, the reaction may allow for sequestration of $CO_2$ from exhaust streams of power plants and the like. In other embodiments, the $CH_4$ is at a higher concentration, for example, in a gas stream from a natural gas field. Other components may be present in the feed gas 102, such as $C_2H_6$, $C_2H_4$, and the like. In one embodiment, the feed gas 102 has been treated to remove these components, for example, for sale as product streams.

The feed gas 102 is passed through a heat exchanger 104 to be heated for reaction. During continuous operation, a portion of the heating is provided using heat 106 recovered from the reaction. The remaining heat for the reaction may be provided by an auxiliary heater, as described below. During start-up, the auxiliary heater is used to provide the total heat to bring the feed to an appropriate reaction temperature, e.g., about 500-1200° C. (about 930-2192° F.). In one embodiment, the feed is heated to between about 600° C. (about 1112° F.) and about 1050° C. (about 1742° F.). In another embodiment, the feed is heated to between about 850° C. (about 1562° F.) and about 950° C. (about 1742° F.). In another embodiment, the feed is heated to between about 890° C. (about 1634° F.) and about 910° C. (about 1742° F.). The heated feed gas 108 is fed to a hybrid reactor 110.

In the hybrid reactor 110, a catalyst reacts with a portion of the heated feed gas 108 to form carbon allotropes 112 using the Bosch reaction. As described in more detail below, the hybrid reactor 110 can include multiple functional zones, optimized for reaction, attrition, catalyst separation, gas separation, and the like. Any number of different catalysts may be used, including, for example, metal shot, supported catalysts, and the like. The carbon allotropes 112 are separated from the flow stream 114 out of the hybrid reactor 110, leaving a waste gas stream 116 containing excess reagents and water vapor. At least a portion of the heat from the flow stream 114 is used to form the heated feed gas 108 prior to the flow stream 114 entering the chiller as the waste gas stream 116.

The waste gas stream 116 is passed through an ambient temperature heat exchanger, such as water chiller 118, which condenses out the water 120. The resulting dry waste gas stream 122 is used as a feed stream for a gas separation system 124. It can be understood that a dry waste gas stream, as used herein, has the bulk of the water removed, but may still have small amounts of water vapor. For example, the dew point of a dry waste gas stream 122 may be greater than about −5° C. (about 23° F.), greater than about 0° C. (about 32° F.), greater than about 5° C. (about 41° F.), greater than about 10° C. (about 50° F.), greater than about 20° C. (about 68° F.), or higher. A dryer may be used to lower the dewpoint, for example, to about −50° C. (about −58° F.), about −70° C. (about −94° F.), or lower, prior to gas separation.

The gas separation system 124 removes a portion of the reagent having the lower concentration in the feed gas 102 and recycles it to the process, for example, by blending a recycle stream 126 with the feed gas 102. The higher concentration gas in the feed gas 102 can be disposed of as excess feed 128, for example, by sales to downstream users. As an example, if $CO_2$ is the highest concentration gas in a blend with $CH_4$, the gas separation system 124 can be used to remove $CH_4$ remaining in the waste gas stream, and send it back into the process as recycle 126. The process functions as an equilibrium reaction between the reagents and solid carbon, as discussed further with respect to FIG. 2. The gas separation system 124 may not be needed when the $CH_4$ is in excess, as much of the $CO_2$ may be consumed in the reaction. Thus, the excess feed 128 that contains the $CH_4$, and which may also contain $H_2$, CO, and other gases, may be used to generate power in a power plant without further purification or gas separation, as discussed with respect to FIG. 1C.

FIG. 1B is a block diagram of the use of an excess carbon dioxide feed in an enhanced oil recovery (EOR) process. If the excess feed gas 102 (FIG. 1) is $CO_2$, the excess feed 128 may be sold to a distributor for marketing through a pipeline 130. Individual users may obtain the $CO_2$ from the pipeline 130 and use it in enhanced oil recovery processes 132. For example, the $CO_2$ can be used to pressurize hydrocarbon reservoirs to increase the recovery of hydrocarbons.

FIG. 1C is a block diagram of the use of an excess methane feed in a power generation process. If the excess feed gas 102 (FIG. 1) is $CH_4$, the excess feed 128 can be used in a power plant 134 to generate power, either on-site, or after transporting the excess feed 128 through a pipeline to the power plant 134. The electricity 136 generated in the power plant 134 can be used on-site to power the reaction system 100 or may be provided to a grid for use by other consumers. The excess feed 128 can contain a number of other gases as by-products of the formation of the carbon allotropes, and, thus, the excess feed 128 may be purified prior to any commercial sales, such as to a pipeline company. Further, the excess feed may be used in a liquefaction process to form liquefied natural gas (LNG) for sale.

FIG. 2 is a C—H—O equilibrium diagram 200 of the equilibria between carbon 202, hydrogen 204, and oxygen 206, indicating species in equilibrium at various temperature conditions. There is a spectrum of reactions involving these three elements in which various equilibria have been named as reactions. The equilibrium lines at various temperatures that traverse the diagram show the approximate regions in which solid carbon will form. For each temperature, solid carbon will form in the regions above the associated equilibrium line, but will not form in the regions below the equilibrium line.

Hydrocarbon pyrolysis is an equilibrium reaction between hydrogen and carbon that favors solid carbon production, typically with little or no oxygen or water present, e.g., along the equilibrium line 208 from higher hydrogen 204 content to higher carbon 202 content. The Boudouard reaction, also called the carbon monoxide disproportionation reaction, is an equilibrium reaction between carbon and oxygen that favors solid carbon production, typically with little or no hydrogen or water present, and is along the equilibrium line 210, from higher oxygen 206 content to higher carbon 202 content.

The Bosch reaction is an equilibrium reaction that favors solid carbon production when carbon, oxygen, and hydrogen are present. In the C—H—O equilibrium diagram 200, the Bosch reactions are located in the interior region of the triangle, for example, in region 212, where equilibrium is established between solid carbon and reagents containing carbon, hydrogen, and oxygen in various combinations. Numerous points in the Bosch reaction region 212 favor the formation of CNTs and several other types of carbon allotropes. The reaction rates and products may be enhanced by the use of a catalyst, such as iron. The selection of the catalysts, reaction gases, and reaction conditions may provide for the control of the type of carbon formed. Thus, these methods open new routes to the production of carbon allotropes, such as CNTs.

Reaction Systems

Figure 3:
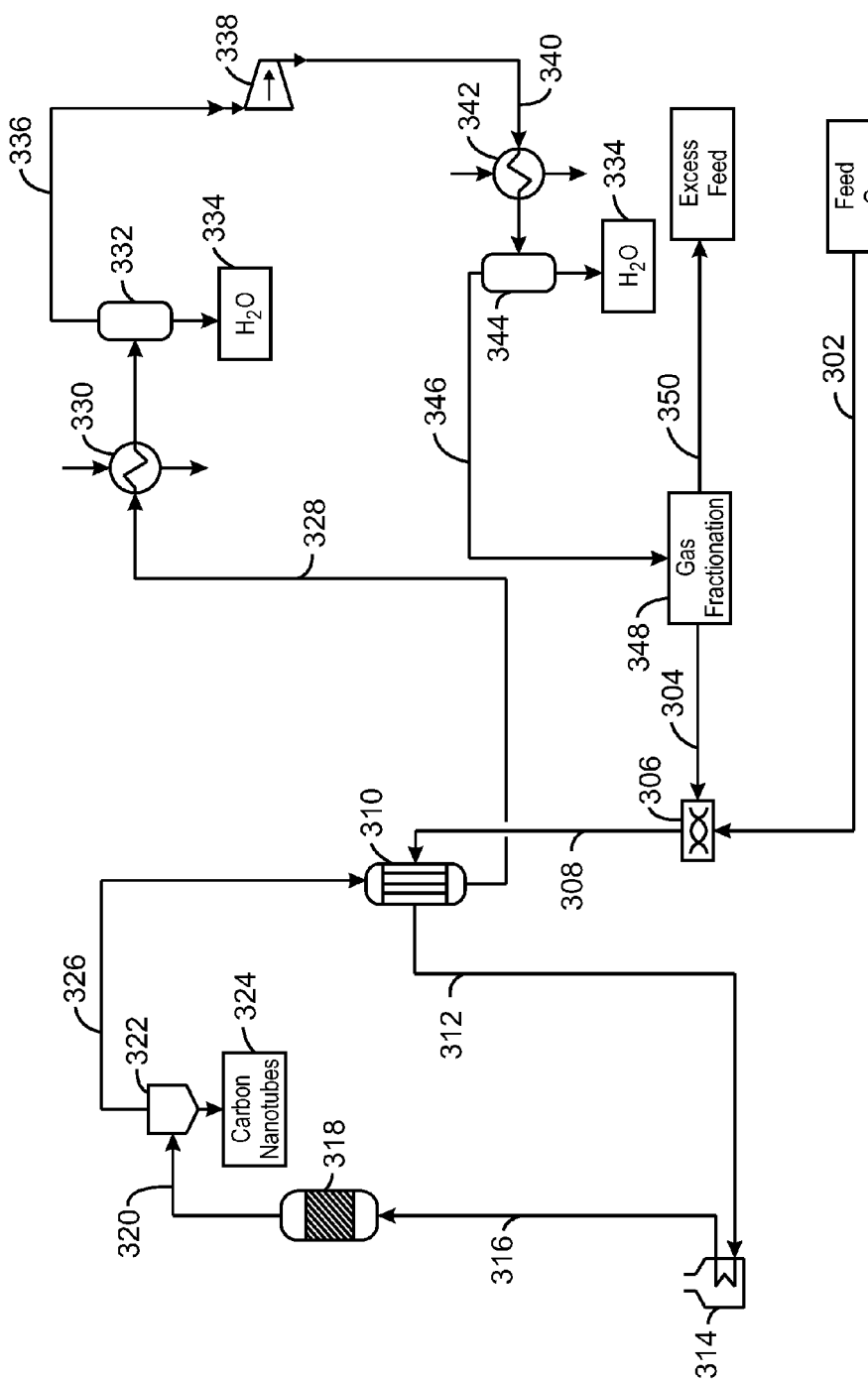
FIG. 3 is a simplified process flow diagram of a reactor system for making carbon allotropes from a gas feed that includes carbon dioxide and methane.

FIG. 3 is a simplified process flow diagram of a reactor system 300 for making carbon allotropes from a gas feed that includes carbon dioxide and methane. As shown, the one reactor system 300 can be used for feed gas 302 that is higher in $CO_2$ or higher in $CH_4$. In the reaction system 300, the feed gas 302 is combined with a recycle gas 304 that has an enhanced concentration of the lesser gas. This may be done using a static mixer 306.

The combined gas stream 308 is passed through a heat exchanger 310 or set of heat exchangers 310 in series to be heated by a reactor effluent stream. The temperature can be raised from a near ambient temperature, as defined herein, to an appropriate reaction temperature, such as about 500° C. (930° F.), about 750° C. (about 1382° F.), about 850° C. (about 1562° F.), about 950° C. (about 1742° F.), about 1050° C. (about 1742° F.), or about 1200° C. (about 2192° F.) for the heated gas stream 312. This temperature may be sufficient for maintaining the reaction during continuous operations. However, part of the heat may be provided by a heater 314, which may be especially useful for adding heat to bring the reactants up to temperature during start-up. The hot gas stream 316 is then introduced into a hybrid reactor 318. Hybrid reactor designs that may be used are discussed with respect to FIGS. 6 through 11.

The carbon allotropes are carried from the hybrid reactor 318 in a reactor effluent stream 320. The reactor effluent stream 320 may be at an elevated temperature, for example, about 600° C. (about 1112° F.), about 1050° C. (about 1742° F.), or about 1200° C. (about 2192° F.), and may be cooled by exchanging heat with the combined gas stream 308, for example, providing some or all of the heat used to heat the reactants. Either prior to or after cooling, the reactor effluent stream 320 is passed through a separation device 322, such as a cyclonic separator, to remove the carbon allotropes 324. The resulting waste gas stream 326 can used to provide heat to the combined gas stream 308 in the heat exchanger 310. The carbon allotropes may also be removed in secondary separation devices (not shown) at lower temperatures than the waste gas stream 326.

After providing heat to the combined gas stream 308, the cooled waste stream 328 is passed through an ambient temperature heat exchanger 330 and then fed to a separation vessel 332. Water 334 settles in the separation vessel 332 and is removed from the bottom. The resulting gas stream 336 may be significantly cooler, for example, at about 30° C. (about 86° F.), about 38° C. (about 100° F.), about 40° C. (about 104° F.) and at a pressure of about 2500 kilopascals (kPa) (about 363 psia), about 3000 kPa (about 425 psia), about 3720 kPa (about 540 psia), or about 4000 kPa (about 580 psia). Operations are not limited to ambient temperature cooling, as in some embodiments it may be desirable to use sub-ambient cooling systems. For example, the heat exchanger may use a glycol/water based stream in the heat exchanger 330. In one embodiment, the gas is then dried to a low dew point in a drier (not shown). The stream enters a compressor 338 that increases the pressure of the gas stream 336 for example, to about 5000 kPa (about 725 psia), about 6000 kPa (about 870 psia), about 7000 kPa (about 1015 psia), about 7,240 kPa (about 1050 psia), or about 8000 kPa (about 1160 psia), forming a high pressure stream 340 which is passed through another ambient temperature heat exchanger 342. From the ambient temperature heat exchanger 342, the high pressure stream 340 is fed to a separation vessel 344 for removal of any remaining water 334, for example, if a drier has not been used.

In embodiments in which the $CO_2$ is in excess in the feed gas 302, the dried gas stream 346 is then sent to a gas separation system 348, which separates the excess feed 350 from the recycle gas 304. In reaction systems 300 based on a proportionate excess of $CO_2$, the excess feed 350 may primarily include $CO_2$ and the recycle gas 304 may primarily include $CH_4$. In reaction systems 300 based on a proportionate excess of $CH_4$, the excess feed 350 will not have a substantial $CO_2$ content, and a portion may be recycled without further purification. In some embodiments, a portion of the excess feed 350, the recycle gas 304, or both may be tapped to provide a fuel gas stream, a purge gas stream, or both for use in the plant.

The reaction conditions used can cause significant degradation of metal surfaces, as indicated by choice of the catalyst itself, which may include carbon steel beads, stainless steel beads, or any number of other materials, as discussed herein. Accordingly, the process may be designed to decrease the amount of metal exposed to the process conditions, as discussed further with respect to the following figures.

Figure 4:
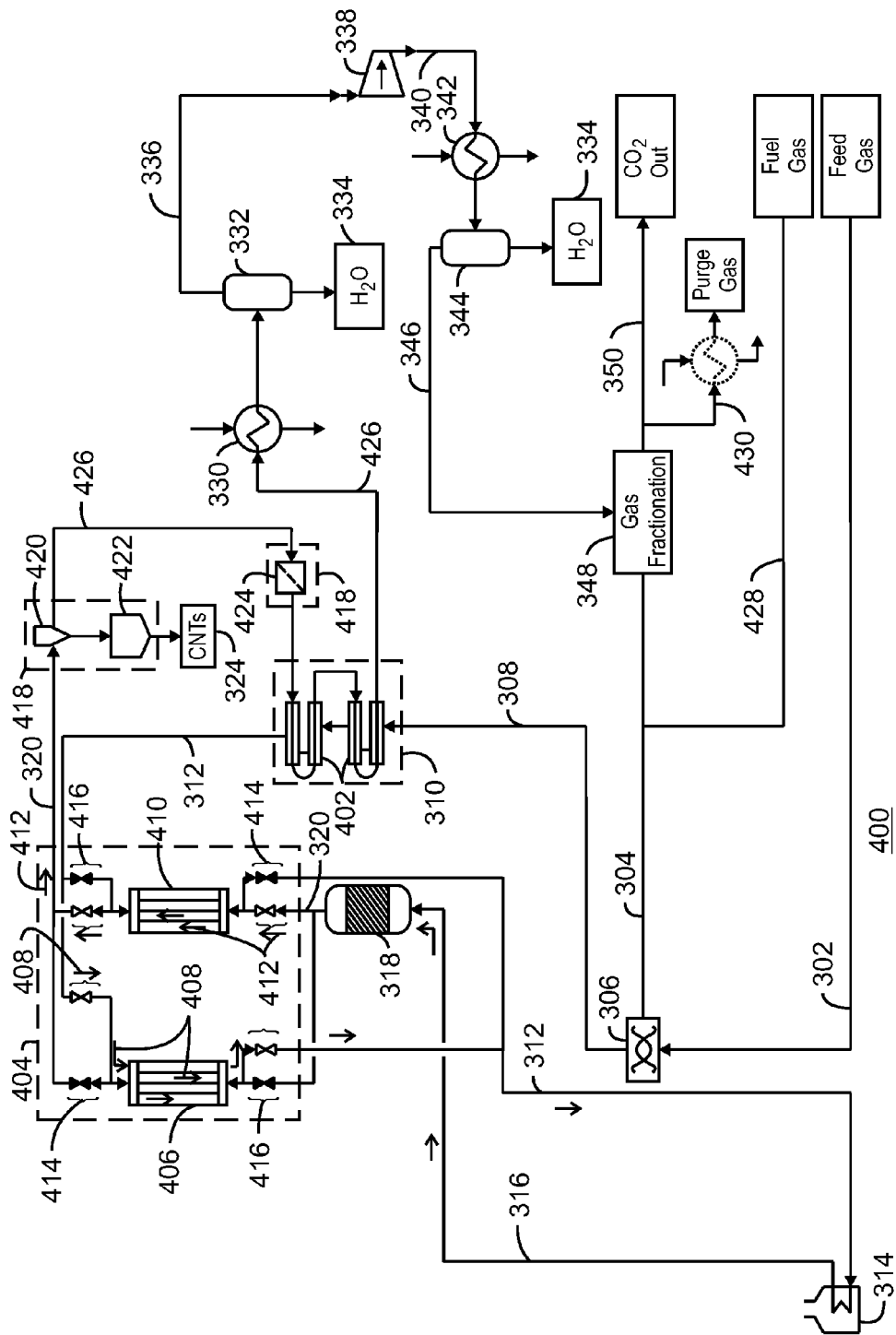
FIG. 4 is a simplified process flow diagram of another reactor system for making carbon allotropes from a gas feed that includes carbon dioxide and methane.

FIG. 4 is a simplified process flow diagram of another reactor system 400 for making carbon allotropes from a gas feed that includes carbon dioxide and methane. In FIG. 4, like number items are as described with respect to FIG. 3. As for FIG. 3, the feed gas 302 passes through a static mixer 306 where it is combined with a recycle gas 304, which is high in methane. The combined gas stream 308 is passed through a heat exchanger 310, for example, including multiple shell and tube heat exchangers 402. The main difference between the more detailed process flow diagram of FIG. 4 and that of FIG. 3 is the use of heat exchangers to cool the reactor effluent stream 320 prior to separating the carbon allotropes from the reactor effluent stream 320.

In this embodiment, the heated gas stream 312 is raised to a temperature of about 300° C. (about 572° F.), about 400° C. (about 752° F.), about 427° C. (about 800° F.), or about 500° C. (about 932° F.) in the heat exchanger 310 prior to flowing through a second heat exchanger 404. In the second heat exchanger 404, the heated gas stream 312 flows through a first ceramic block heat exchanger 406, as indicated by arrows 408. Heat stored in the first ceramic block heat exchanger 406 is exchanged to the heated gas stream 312 and may increase the temperature to about 500° C. (930° F.), about 750° C. (about 1382° F.), about 850° C. (about 1562° F.), about 950° C. (about 1742° F.), about 1050° C. (about 1742° F.), or about 1200° C. (about 2192° F.).

While the first ceramic block heat exchanger 406 is used to heat the heated gas stream 312, a second ceramic block heater 410 is used to cool the reactor effluent stream 320 by flowing this stream through the second ceramic block heater 410, as indicated by arrows 412. When the second ceramic block heat exchanger 410 reaches a selected temperature, or the first ceramic block heat exchanger 406 drops to a selected temperature, the positions of the inlet valves 414 and outlet valves 416 are changed. In other words, open valves are closed and closed valves are opened. The change in the positions of the valves changes which ceramic block heat exchanger 406 or 410 is being heated by the flow from the reactor 318 and which ceramic block heat exchanger 406 or 410 is used to heat the heated gas stream 312. The valves are not limited to the configuration shown, as the inlet valves 414 and outlet valves 416 may be replaced with three way valves in some embodiments.

The heat may not be sufficient to increase the temperature sufficiently for reaction. Thus, as described with respect to FIG. 3, a heater 314 can be used to further boost the temperature of the heated gas stream 312, forming the hot gas stream 316, which can be fed to the hybrid reactor 318. Carbon allotropes, such as carbon nanotubes, are formed in the hybrid reactor 318, and carried out in the reactor effluent stream 320.

After flowing through the second ceramic block heater 410, the reactor effluent 320 is flowed to a separation system 418, which is used to remove the carbon allotropes 324 from the reactor effluent 320. In this embodiment, the separation system 418 for the carbon allotropes includes a cyclonic separator 420, a lock hopper 422, and a filter 424. In an embodiment, the cyclonic separator 420 and the lock hopper 422 may be placed upstream of the ceramic block heat exchangers 406 and 410. After the majority of the carbon allotropes are removed by the cyclonic separator 420 and deposited into the lock hopper 422, the filter 424 is used to remove remaining carbon allotropes from the waste gas stream 426. This may help to prevent plugging, or other problems, caused by residual carbon allotropes in the waste gas stream 426. The filter 424 can include bag filters, sintered metal filters, and ceramic filters, among other types. From the separation systems 418, the carbon allotropes may be directed to a packaging system, as discussed in further detail with respect to FIG. 14. After the filter 424, the waste gas stream 426 is flowed through the heat exchanger 310 before flowing to the ambient temperature heat exchanger 330 and then fed to a separation vessel 332 for separation of the water. After flowing through the separation vessel 332, the flow is as described with respect to FIG. 3.

In this embodiment, two extra streams may be provided from the separated streams out of the gas separation system 348. A fuel gas stream 428 may be taken from the recycle gas 304 and sent to a power plant, such as power plant 134 (FIG. 1). A purge gas stream 430 may be taken from the $CO_2$ outlet stream, which can be used to purge various pieces of equipment, such as the filter 424 or cyclone separator 420.

Reactor Systems

Figure 5:
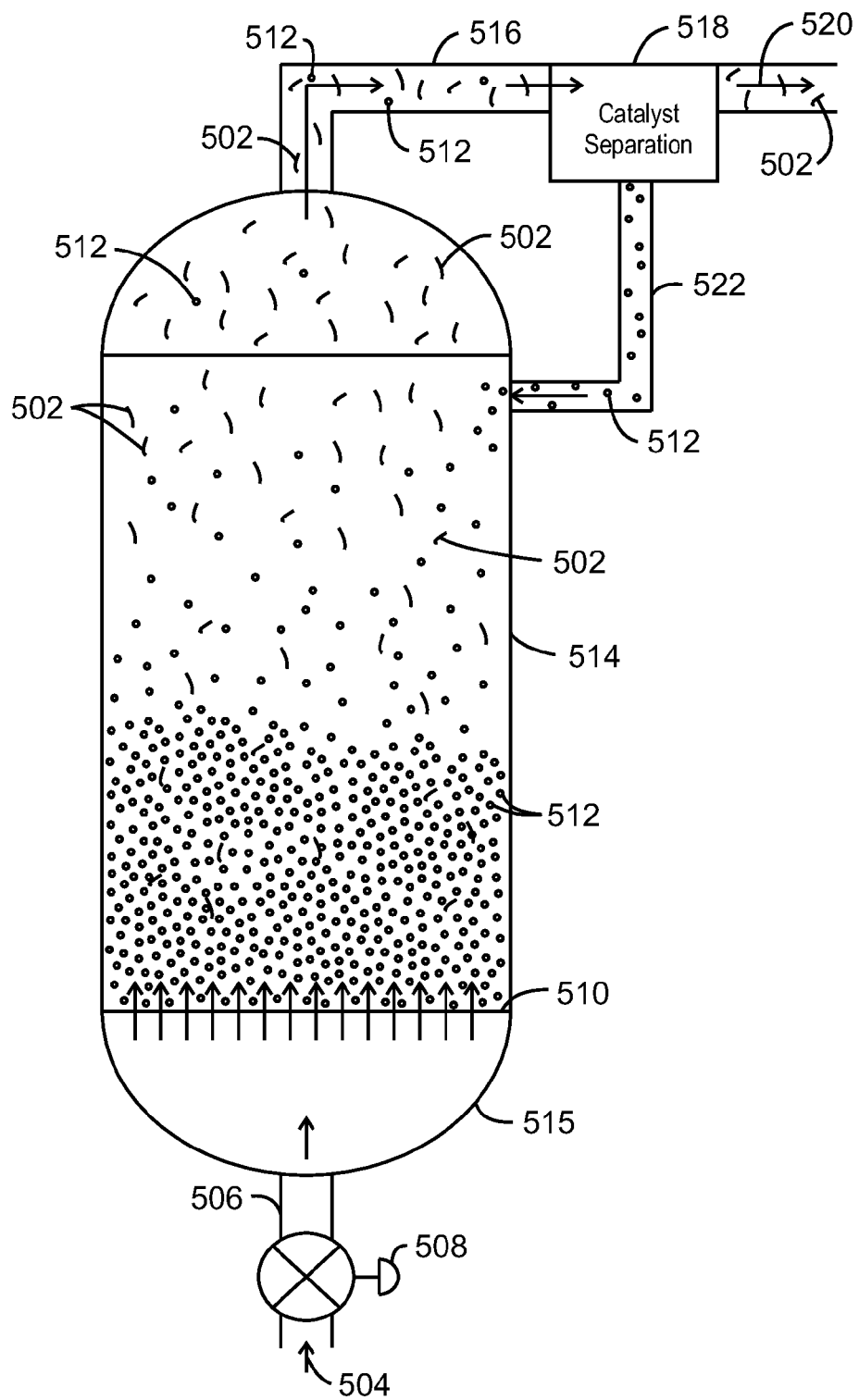
FIG. 5 is a drawing of a reactor for forming carbon allotropes.

FIG. 5 is a drawing of a reactor 500 for forming carbon allotropes 502. A hot gas feed stream 504 is fed through a line 506 into the bottom of the reactor 500. A control valve 508 may be used to regulate the flow of the hot gas feed stream 504 into the reactor 500. The hot gas feed stream 504 flows through a distributor plate 510 and will fluidize a bed of catalyst beads 512 held in place by the reactor walls 514. As used herein, "fluidize" means that the catalyst beads 512 will flow around each other to let gas bubbles through, providing a fluid-like flow behavior. As discussed herein, the reaction conditions are very harsh to any exposed metal surface, as the metal surface will perform as a catalyst for the reaction. Thus, the reaction will result in the slow degradation of an exposed metal surface. Accordingly, the interior surface of the reactor, including the reactor walls 514 and heads 515, as well as the distributor plate 510, and other parts, can be made of a ceramic material to protect the surfaces.

As the hot gas feed stream 504 flows through the fluidized bed of catalyst beads 512, carbon allotropes 502 will form from catalyst beads 512. The flowing hot gas feed stream 504 carries the carbon allotropes 502 into an overhead line 516 where they are removed from the reactor 500. Depending on the flow rate, for example, as adjusted by the control valve 508, some amount of catalyst beads 512, or particles fragmented from the catalyst beads 512, may be carried into the overhead line 516. Accordingly, a catalyst separator 518 may be used to separate catalyst beads 512, and larger particles, from a reactor effluent stream 520 and return them to the reactor 500 through a recycle line 522. Any number of configurations may be used for the catalyst separator 518, including a cyclonic separator, a settling tank, a hopper, and the like. Further, any number of reactor designs can be used. A separate catalyst separator 518 may not be needed in various designs, as a separation zone may be included in a hybrid reactor design.

The reactor design must balance various phenomena to be effective. Each of these phenomena has a different time scale that must be managed simultaneously by the reactor concept. The reactor phenomena and corresponding timescales are summarized in Table 1 for the production of carbon nanotubes. The growth time scales may be somewhat different for other types of carbon allotropes.

TABLE 1

Reactor Phenomena and Their Time Scales

| Phenomenon | Time Scale |
|---|---|
| Reaction | ~100 seconds (s) |
| Gas Flow | ~1 s |
| CNT growth | ~250 s |
| CNT attrition | ~10 s |
| CNT freeboard growth | ~40 s |
| Catalyst Loss | ~20,000 s |

These phenomena, each with their unique time scale, control the reactor design. The first phenomenon is that of the catalytic chemical reaction, itself. As discussed herein, various metals, intermetallics, and supported metal catalysts are potential catalytic materials for this reaction. At the operating conditions of the reactor, which can include various pressures and temperatures, the reaction has a time scale on the order of minutes. For example, the pressures that may be involved are between about 0.1 KPa (about 0.015 psia) and about 7000 KPa (about 1015 psia), between about 3000 KPa (about 435 psia) to about 5000 KPa (about 725 psia), or between about 3500 KPa (about 508 psia) to about 4500 KPa (about 653 psia). The temperatures of the reaction may be in the range of between about 800° C. (about 1472° F.) and about 1050° C. (about 1922° F.), or about 850° C. (about 1562° F.) to about 950° C. (about 1742° F.).

Another phenomenon is that of the gas flow in the reactor. Due to the use of a catalyst the gas passes through the reactor quickly, on the order of seconds. In this time frame the reaction conversion should be 10% to 20% on a single pass basis for CNTs to be economically produced.

Another phenomenon is the growth of CNTs to a particular length. Assuming that the average length is 100 microns, the growth time may be about four minutes. However, this time may be cut short by the attrition of the CNTs from the catalyst surfaces, e.g., catalyst particles, within the reactor bed. The time scale for carbon nanotube attrition may be between about 10 s and about 3600 s. In addition, the growth time may be extended by the time that the gas passes through the reactor (on the order of one second).

The growth time may also be extended by the time for gas to pass through the freeboard of the reactor, and any additional piping, before a cyclone separator removes the carbon allotropes from the hot reactant gases. Freeboard CNT growth is growth that continues on catalyst particles that are in the predominantly gas-filled volume above the fluidized bed. This volume is commonly referred to as the freeboard in the art. The catalyst particles can be in the form of distinct catalyst particles of micro-scale (~1 micron and larger) or in the form of catalyst nano-scale particles (~10-1000 nanometers) to which typically one or more carbon nanotubes are attached. The time in the freeboard may be controlled by the design of the reactor and may be as long as 40 seconds (s). As used herein, the freeboard is the head space in the reactor above a reaction bed.

It can be noted that the catalyst is consumed very slowly during the course of the reaction. As a result, another phenomenon is the catalyst consumption. Assuming 400 micron (0.4 mm) steel grit as the catalyst, the average catalyst removal time is on the order of 55 hours. It can also be noted that the steel grit catalyst needs to be reduced so that the surface does not have an oxide layer, before it is an effective catalyst. The reduction of the catalyst is typically done during start up and is not an important time scale for the steady state operation of the reactor. However, having a short catalyst reduction time is also an important advantage. Shorter reduction times occur with larger catalyst particles that have smaller specific surface areas. Any reactor design must manage these phenomena and their associated time scales to be an appropriate design for this reaction.

Further, at the operating conditions used, metal dusting corrosion is significant unless high alloy steels are used, including, for example, Inconel 693, Inconel 696, and others with high chromium equivalent content, e.g., greater than 24%. The reactors may be designed with refractory lined carbon steel vessels allowing the steel walls to be kept cool and protected from the reactions, minimizing corrosion and erosion. FIGS. 6-11 show various reactor designs that may be used in embodiments.

Figure 6:
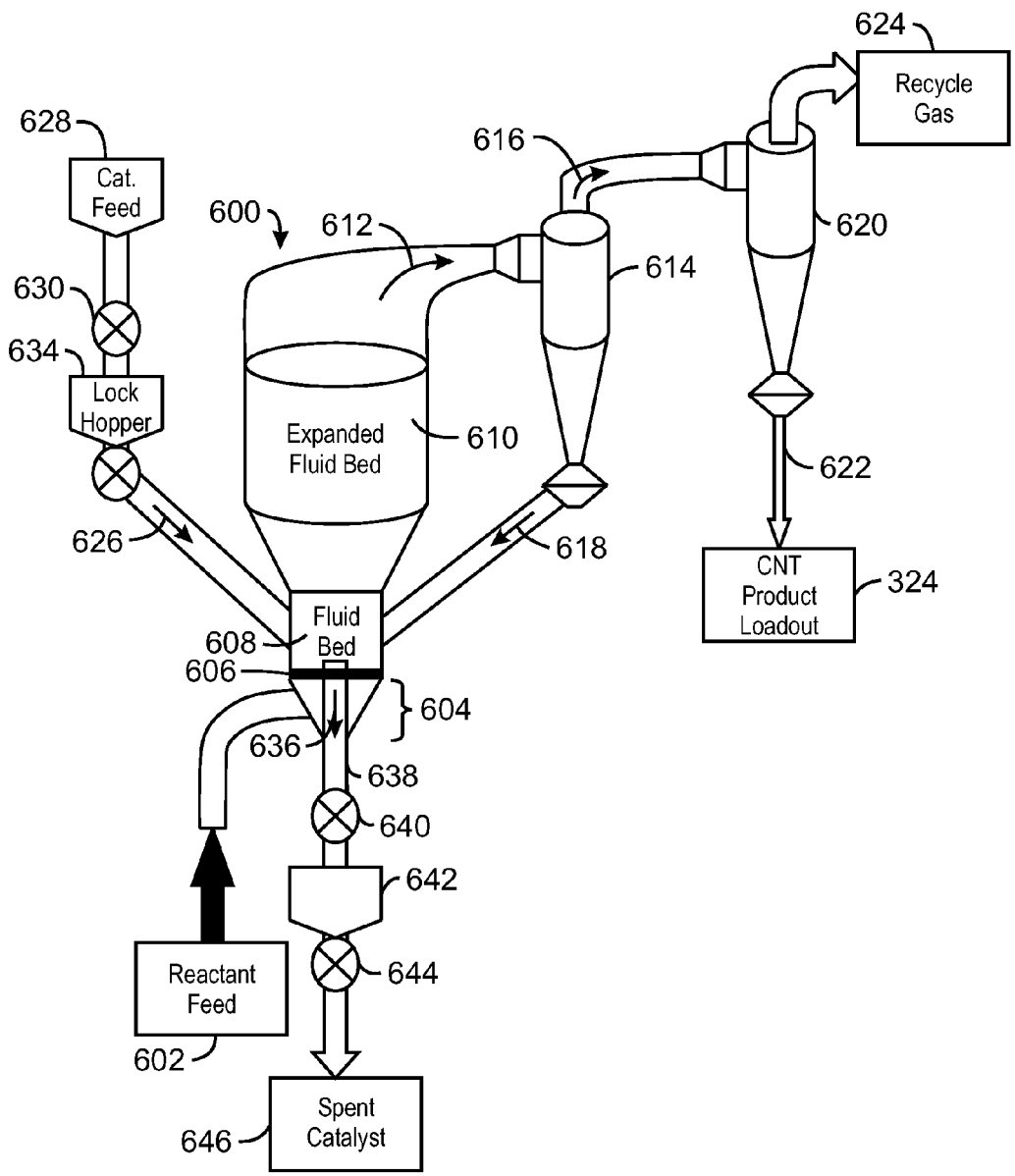
FIG. 6 is a drawing of a hybrid fluidized bed reactor for forming carbon allotropes.

FIG. 6 is a drawing of a hybrid fluidized bed reactor 600 for forming carbon allotropes. In the hybrid fluidized bed reactor 600 the reactant gases 602 enter the reactor plenum 604 below the distributor plate 606. The distributor plate 606 distributes the reactant gases 602 into the fluidized bed 608, maintaining the fluidization of the material in the bed. As the reactant gases 602 pass through the fluidized bed 608, the reactants are consumed and carbon allotropes, such as carbon nanotubes (CNTs), and water are produced. The carbon allotropes are attrited from the surface of the catalyst and move into the expanded bed area 610. Lighter catalyst particles, with active catalyst sites, are also carried into the expanded bed area 610, where their residence time is increased and further reaction takes place. The increased area of the expanded bed area 610 decreases the velocity of the reactant gases 602, allowing heavier catalyst particles to settle back into the fluidized bed 608.

The carbon allotropes are eventually eluted from the expanded bed area 610 in an effluent stream 612 that includes product gases, catalyst particles, and the carbon allotropes. The effluent stream is passed to a catalyst separation cyclone 614. In the catalyst separation cyclone 614, the product gases 616, including the carbon allotropes, are separated from the eluted catalyst particles 618. The catalyst particles 618 are returned to the fluidized bed 608. The product gases 616 and the carbon allotropes are passed to a product separation cyclone 620, where the carbon allotropes 622 are removed from the product gases 616. The resulting recycle gases 624 may then be recycled in the process, for example, as waste gas stream 326 (FIG. 3) or 426 (FIG. 4).

Fresh catalyst 626 is fed from a catalyst feed vessel 628 to the fluidized bed 608 using a lock hopper system that includes two valves 630 and 632 and a lock hopper 634. The lock hopper 634 is pressurized with reactant gases 602, to eliminate air before the catalyst 626 is fed to the reactor plenum 604.

A spent catalyst removal system may be used to continuously remove spent catalyst 636 and other solid wastes from the reactor. The spent catalyst removal system can include a pipe 638 that projects through the distributor plate 606 and leads to a valve 640, a lock hopper 642, and another valve 644. The valves 640 and 644 allow material that is removed from the reactor 600 to be cooled, depressurized, and purged with an inert gas prior to be dropped into a spent catalyst vessel 646.

The design of the reactor 600 can control the various time scales for reaction, attrition, and carbon allotrope growth in both the lower fluid bed 608 and the expanded bed area 610. For example, the residence times can be controlled with the diameter and height of the fluidized bed 608, the degree of expansion from the fluidized bed 608 to the expanded bed area 610, and the height of the expanded bed area 610. The rate of attrition, i.e., the separation of carbon allotropes from catalyst particles, can be controlled by the amount of fluidization in the fluidized bed 608, for example, by increasing or decreasing the flow rate of the reactant gases 602. The rate of loss of the catalyst can be controlled by the rate of withdrawal of spent catalyst 635, and subsequent feed of fresh catalyst 626 to maintain a steady state. This can also be balanced by the rate of reaction to produce carbon allotropes, and the inherent loss of catalyst that is carried out of the hybrid fluidized bed reactor 600 with the carbon allotropes 622 that are produced.

A number of modifications may be made to the reactor design discussed with respect to FIG. 6 to change the time scale of the phenomena. As discussed with respect to the following figures, a reactor may be recirculated, have a packed bed, a bottom feed, or any combinations thereof. Further, multiple reactor concepts may be combined to capitalize on the different time scales for different phenomena in each design.

Figure 7:
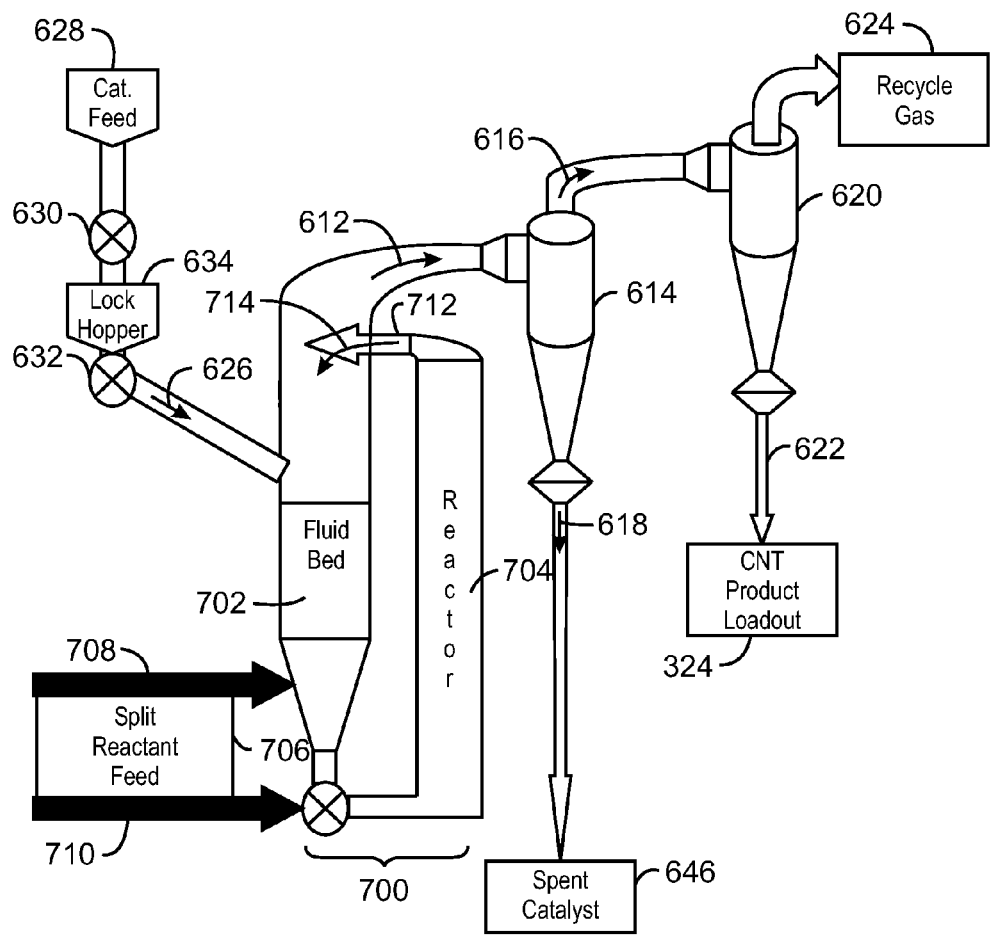
FIG. 7 is a drawing of another hybrid fluidized bed reactor for forming carbon allotropes.

FIG. 7 is a drawing of another hybrid fluidized bed reactor 700 for forming carbon allotropes. Like numbered items are as described with respect to FIG. 6. This reactor 700 includes a fluidized bed 702 and a transport reactor 704 operated in parallel. The reactant feed 706 is split, with a first portion 708 of the reactant feed 706 going into a jet that feeds the fluidized bed 702 and the balance 710 of the reactant feed 706 going to the transport reactor 704. As a result of this design, the catalyst circulates from the fluidized bed 702 to the transport reactor 704. The gas discharge 712 from the transport reactor 704 to the fluidized bed 702 may be arranged to aid in the separation of the catalyst particles from the gas stream 714 so that the particles fall to the fluidized bed 702 as the effluent stream 612 exits to the catalyst separation cyclone 614.

The growth time in the transport reactor 704 can be controlled by the gas flow rate so that it is slightly larger than the terminal settling velocity of the catalyst grit. The terminal settling velocity of a particle is the falling velocity of the particle in a quiescent fluid once the velocity has reached steady state. It is also affected by the concentration of particles in the fluid, with higher particle concentrations resulting in lower terminal settling velocities. The growth time in the fluidized bed 702 is controlled by the diameter and height of the fluidized bed 702. The carbon allotrope attrition rate is controlled the fluidization regime in the bubbling fluidized bed 702. As in the reactor 600 discussed with respect to FIG. 6, there is a lock hopper 634 for the addition of fresh catalyst and two cyclonic separators, a catalyst separation cyclone 614 and a product separation cyclone 620. As shown, the catalyst particles 618 captured in the catalyst separation cyclone 614 are diverted to a spent catalyst vessel 646 for disposal. However, the catalyst particles 618 may be returned from the catalyst separation cyclone 614 to either the fluidized bed 702 or the transport reactor 704. Also, additional carbon allotrope product may be captured from the gas discharge of the product separation cyclone 620, by using a high efficiency particulate capture system, such as multiclones or a particulate filter, among others.

An advantage of the design of the reactor 700 shown in FIG. 7 is the control over the growth time for carbon allotropes. The transport reactor 704 can be operated in a plug-flow manner, in which all of the particles have the same residence time, allowing the growth time to be closely controlled. Further, there is good gas-solid contact in the transport reactor 704. The lack of a distributor plate in the transport reactor 704 also decreases the likelihood of plugging. The transport reactor 704 may also be constructed substantially entirely of refractory lined steel to minimize or eliminate metallic components in direct contact with the potentially corrosive process gas.

Figure 8:
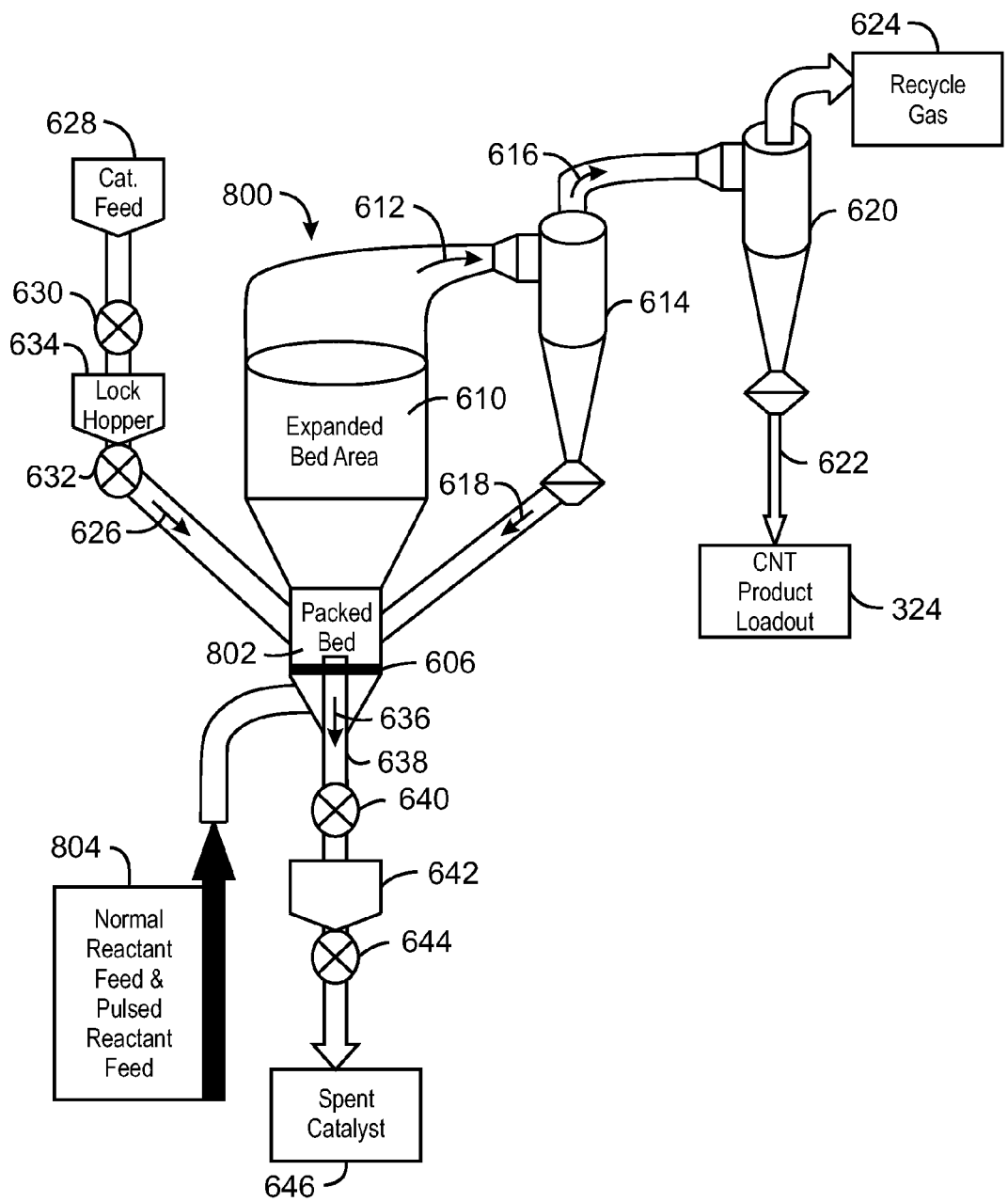
FIG. 8 is a drawing of a hybrid packed bed reactor for forming carbon allotropes.

FIG. 8 is a drawing of a hybrid packed bed reactor 800 for forming carbon allotropes. Like numbered items are as described with respect to FIG. 6. This reactor 800, which is a variant of the design for the reactor 600 shown in FIG. 6, uses a packed bed 802 rather than the fluidized bed 608 discuss with respect to FIG. 6. The packed bed reactor 802 may be used with occasional periods of significantly higher flows of reactant gas 804, e.g., pulses, during which the packed bed 802 becomes fluidized. During the pulses, carbon allotropes are attrited from the catalyst surface. An expanded bed area 610 allows material to slow and settle back to the packed bed 802. Effluent gases 612 are passed to a catalyst separation cyclone 614, which can remove the catalyst particles 618 and return them to the packed bed 802. Depending on the ratio of the diameter of the expanded bed area 610 to the packed bed 606, the catalyst separation cyclone 614 may be eliminated. Carbon allotropes 622, such as CNTs, are removed by a product separation cyclone 620, primarily during the pulses, although some carbon allotropes 618 may carried out of the reactor 800 during the period of time between pulses.

In reactor 800, the growth time for the carbon allotropes 622 is uniquely controlled by the time the reactor 800 is operated in normal (unpulsed) packed bed operation. The attrition time is uniquely controlled by the pulse time when the packed bed 802 becomes fluidized during the pulses. Accordingly, the time between pulses may be used to control production efficiency, product properties, or both.

Figure 9:
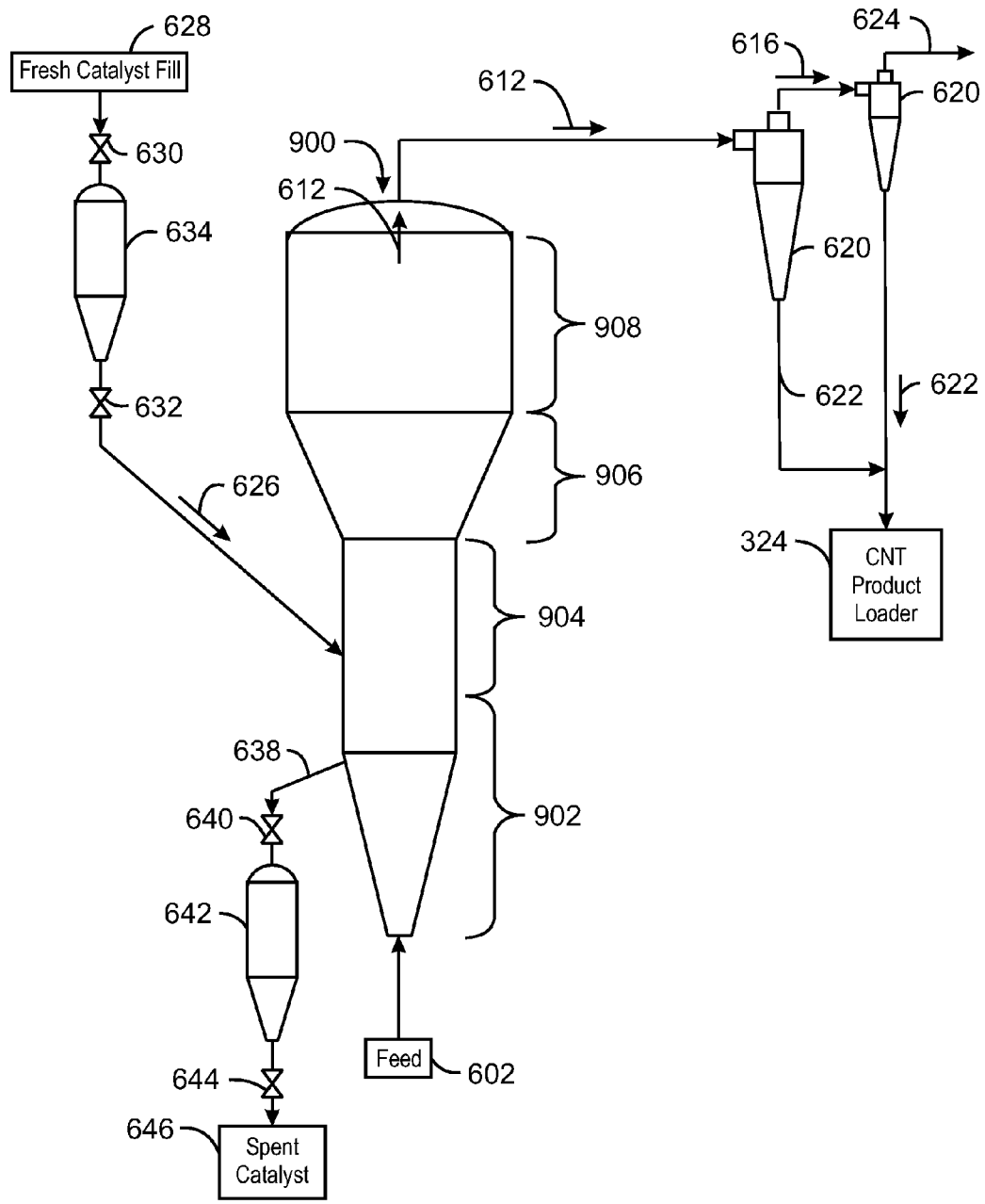
FIG. 9 is a drawing of a hybrid spouted bed reactor for forming carbon allotropes.

FIG. 9 is a drawing of a hybrid spouted bed reactor 900 for forming carbon allotropes. Like numbered items are as described with respect to FIG. 6. This reactor 900 is also a variant of the reactor 600 discussed with respect to FIG. 6. In the reactor 900, a spouted bed 902 is used instead of a fluidized bed. A disengaging section 904 allows particles to slow and fall back into the spouted bed 902. This reactor 900 can utilize somewhat larger catalyst particles than a typical fluidized bed and does not require the use of a gas distribution grid.

As the catalyst particles degrade, forming smaller particles, they can be carried up into a swage 906 that opens up into an expanded bed area 908. Depending on the width of the expanded bed area 908, the amount of catalyst particles carried out in the reactor effluent 612 may be very low. Accordingly, two product separation cyclones 620 may be used instead of a catalyst separation cyclone, enhancing the amount of product isolated. However, in some circumstances, it may be desirable to use a catalyst separation cyclone in place of the first product separation cyclone 620, and direct the isolated material back to the reactor 900.

Figure 10:
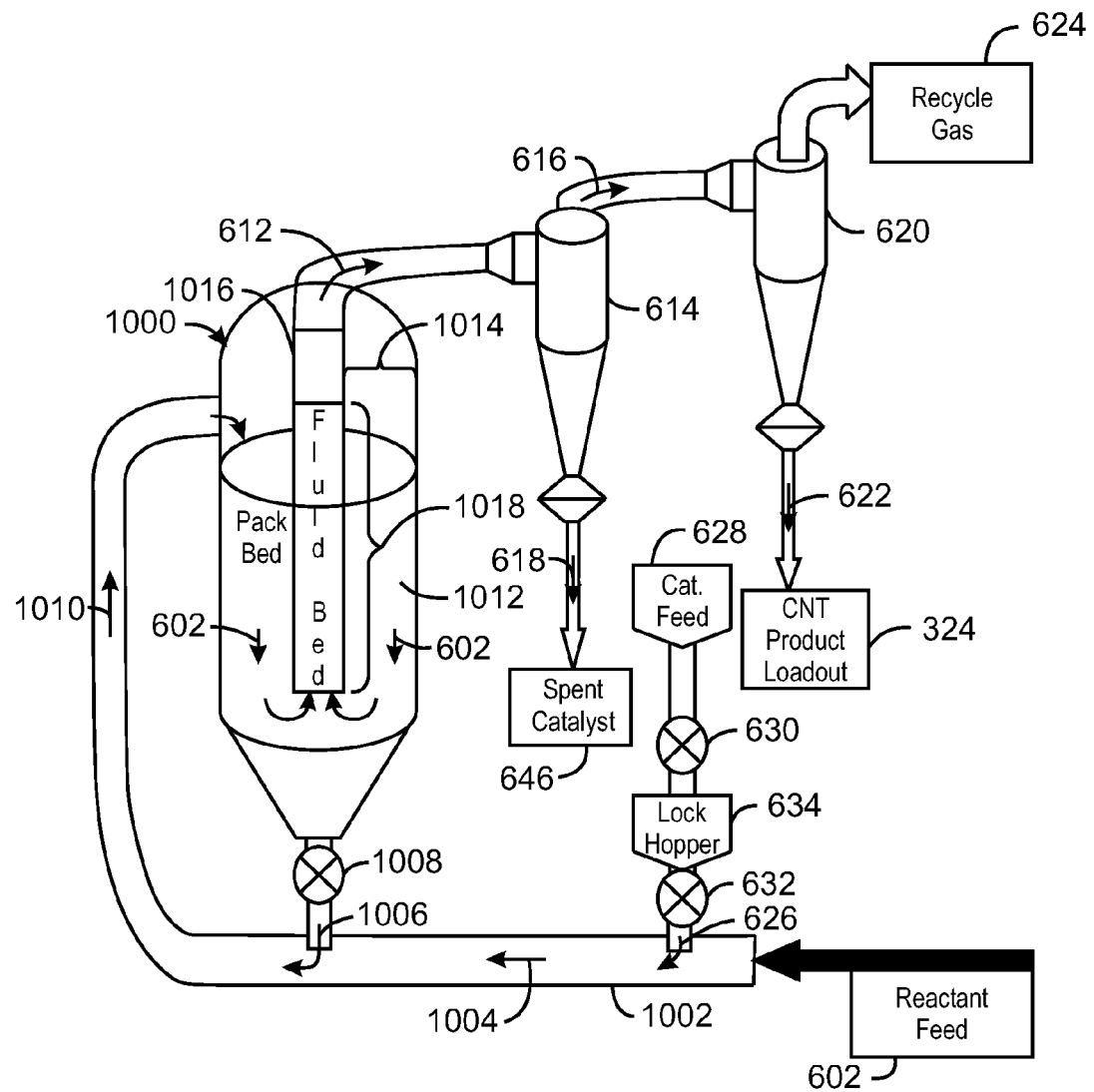
FIG. 10 is a drawing of hybrid packed/fluidized bed reactor for forming carbon allotropes.

FIG. 10 is a drawing of hybrid packed/fluidized bed reactor 1000 for forming carbon allotropes. Like numbered items are as described with respect to FIG. 6. In this reactor 1000, the reactant gases 602 enter through a line 1002 at the bottom of the reactor 1000. Fresh catalyst particles 626 are introduced in the reactant gases 602, and the mixture 1004 is transported by the high velocity flow of the reactant gases 602. Reaction particles 1006 are dropped into the mixture 1004 through a control valve 1008 at the bottom of the reactor 1000. The resulting gas/particulate mixture 1010 proceeds through the line 1002 at high velocity, transporting the mixture 1010 to the upper part of the reactor 1000, where the particles drop onto a moving packed bed 1012. The moving packed bed 1012 drops downward in the annular part 1014 of the body of the reactor 1000. The reactant gases 602 also move downward in the annular part 1014 of the body of the reactor 1000, turn and go upward in a pipe section 1016 internal to the body of the reactor 1000. Reactor effluent 612, carrying product and catalyst exits the reactor 1000 through the pipe section 1016 at the top of the reactor 1000. In the pipe section 1016, a fluidized bed 1018 is formed.

In the reactor 1000, the growth time for carbon allotropes is controlled primarily by the depth and cross sectional area of the packed bed 1012. The ratio of gas flow leaving the reactor to that being recycled in the reactor may also influence the growth time. Freeboard carbon allotrope growth is not needed in this reactor design. The residence time of the catalyst is controlled by the flow rate of catalyst into the reactants at the bottom of the reactor. The time for attrition is controlled by the height and diameter of the fluidized bed 1018. The feed points for fresh catalyst 626 and for reaction particles 1006 that are being recirculated can be of designs typically used for the feed systems for sand blasting. In the reactor 1000, the carbon allotrope growth time can be controlled separately from the catalyst residence time. Further, the attrition time can be controlled separately by the residence time in the fluidized bed 1018.

Other arrangements of this concept are possible, for example side-by-side reactors in which solids are withdrawn from each reactor with standpipes and returned to each with gas-solid transport lines. Another alternative is to have the fluidized bed reactor above the fixed bed reactor. A further alternative would be to arrange the gas and solids to be countercurrent with solids flow downwards and gas flow upwards.

Figure 11:
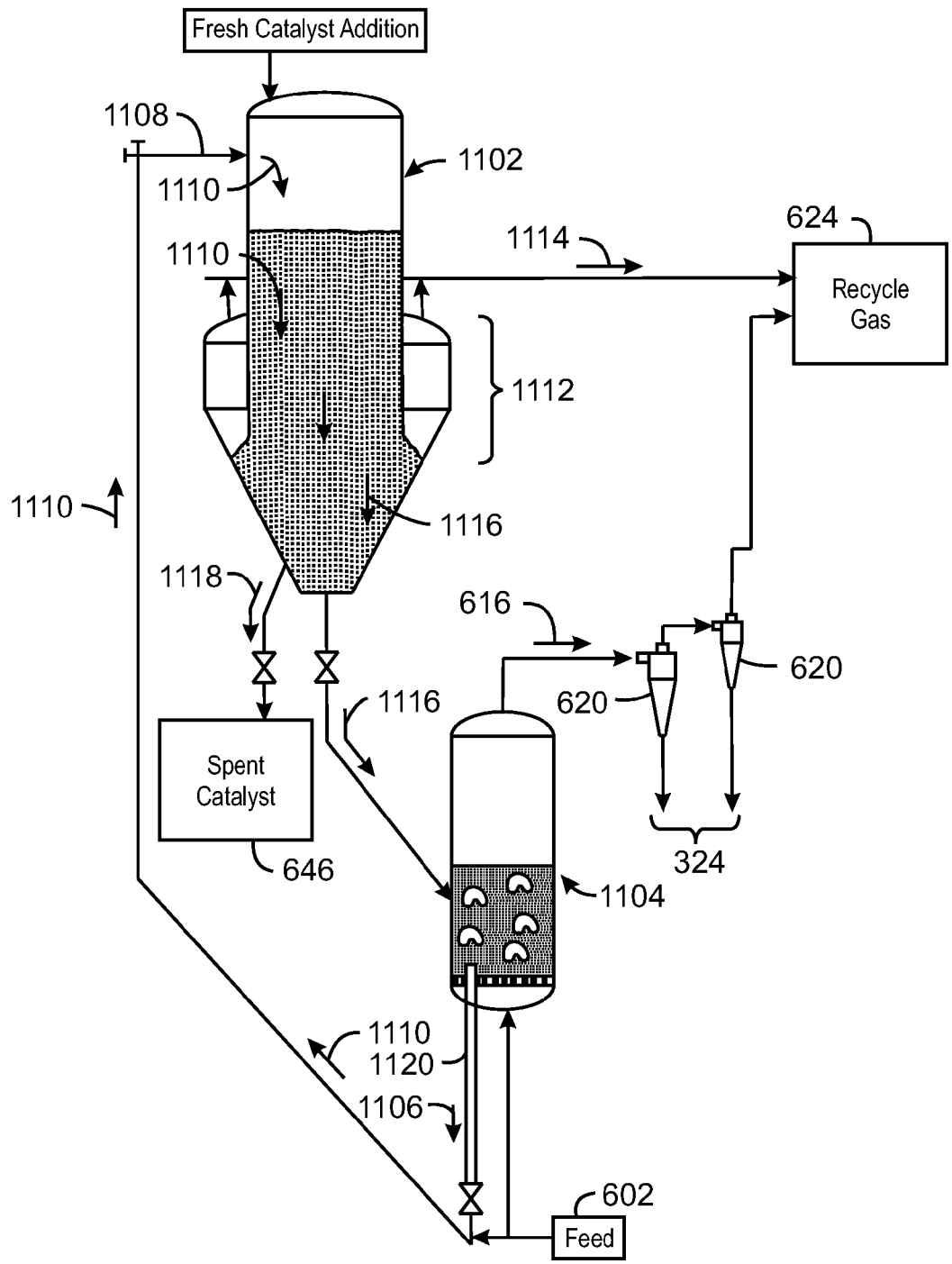
FIG. 11 is a drawing of a two hybrid reactor system for forming carbon allotropes.

FIG. 11 is a drawing of a two hybrid reactor system 1100 for forming carbon allotropes. Like numbered items are as described with respect to FIG. 6. This reactor system 1100 is a variant of a hybrid fixed bed and fluidized bed reactor system, for example, as discussed with respect to FIG. 10. In contrast to reactor 1000, the fixed bed reactor 1102 and the fluidized bed reactor 1104 are separate vessels that are optimized for each reactor type. The primary carbon allotrope growth reaction occurs in the fixed bed reactor 1102, while the fluidized bed reactor 1104 is used to separate the product carbon allotrope from the catalyst particles by attrition.

In this example, the fixed bed reactor 1102 is disposed above the fluidized bed reactor 1104. Catalyst particles 1106 are transported to the inlet 1108 of the fixed bed reactor 1102 in a mixture 1110 with preheated reactant gases 602. The mixture 1110 travels down the fixed bed reactor 1102 to a separation zone 1112 where gas 1114 is separated from the reacted particles 1116. The gas 1114 is recycled in the process, for example, in combination with waste gas stream 326 (FIG. 3) or 426 (FIG. 4). The reacted particles 1116 are sent to the fluidized bed reactor 1104.

In the fluidized bed reactor 1104, the reacted particles 1116 are fluidized with a portion of the reactant gases 602. The primary function of the fluidized bed reactor 1104 is to separate the carbon allotrope product from catalyst particles by attrition, although, depending on conditions, some reaction may be occurring here as well. Attrition aids, such as gas jet attriters may be included in the fluidized bed reactor 1104 to enhance the separation of the carbon allotrope product from the catalyst particles. The separated carbon allotrope product is carried with the gas to gas/solid separation systems, such as product separation cyclones 620, to recover the carbon allotrope product. Catalyst particles 1106 are withdrawn from the fluidized bed reactor 1104, for example, by a standpipe 1120, and may then be returned to the fixed bed reactor 1102 in a gas-solid transport line 1122 in the mixture 1110 with the preheated reactant gases 602. In one embodiment, a portion of the catalyst particles 1106 are disposed of as spent catalyst.

Reactions Forming Carbon Allotropes

Figure 12:
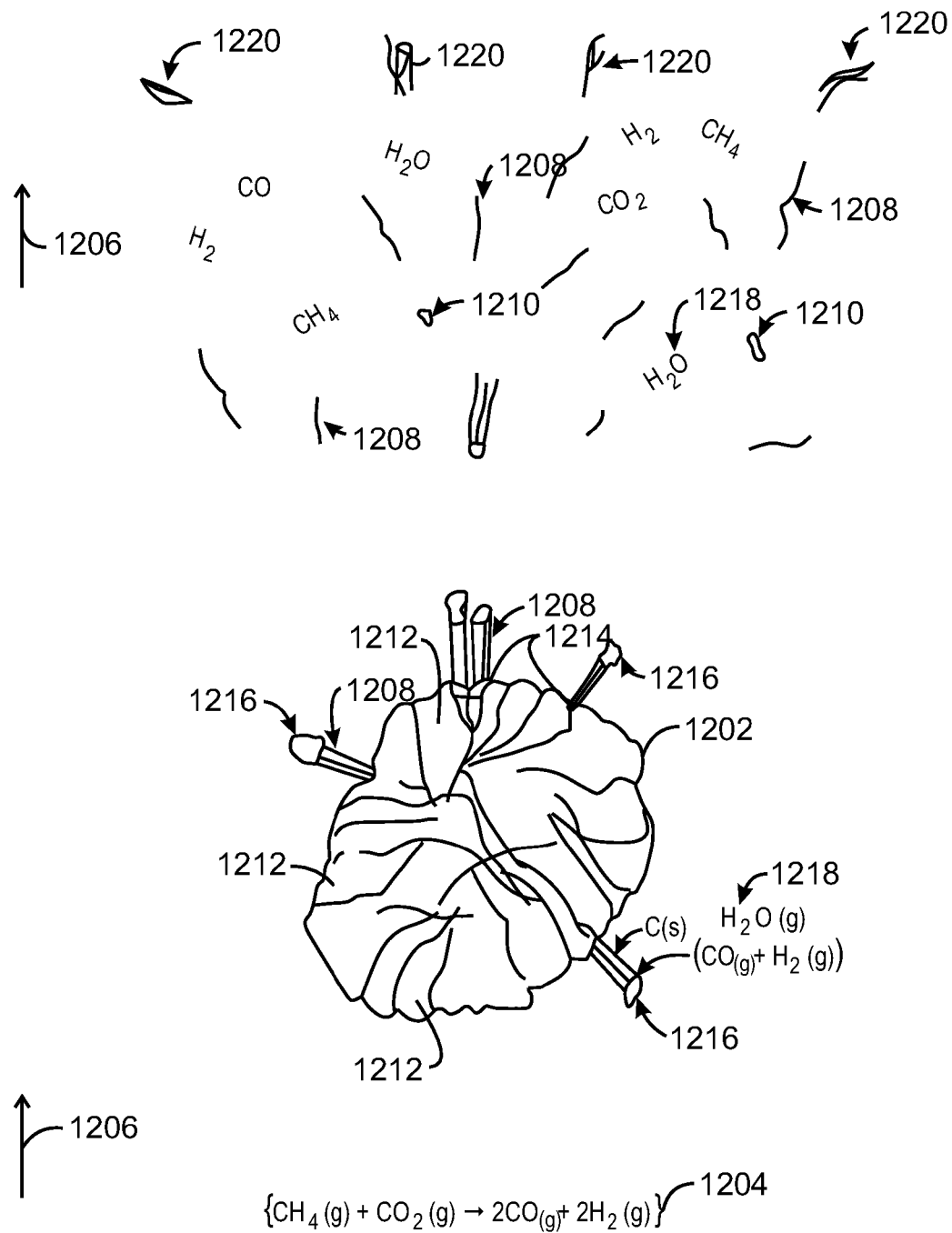
FIG. 12 is a schematic of a catalytic reaction for the formation of carbon allotropes on a catalyst bead.

FIG. 12 is a schematic of a catalytic reaction 1200 for the formation of carbon allotropes, such as carbon nanotubes (CNTs), on a catalyst bead 1202. An initial reaction 1204 between a portion of the $CH_4$ and the $CO_2$ in the hot gas feed stream 1206 results in the formation of CO and $H_2$ in stoichiometric amounts. Excess amounts of the hot gas feed stream 1206 continue to flow through the reactor, helping to fluidize the bed (if needed), and carrying away CNTs 1208 and catalyst particles 1210.

The reactions that form the CNTs 1208 take place on the catalyst bead 1202. The size of the CNTs 1208, and the type of CNTs 1208, e.g., single wall or multiwall CNTs 1208, may be controlled by the size of the grains 1212. In other words, a nucleus of iron atoms of sufficient size at the grain boundary forms the nucleating point for the growth of the carbon products on the catalyst bead 1202. Generally, smaller grains 1212 will result in fewer layers in the CNTs 1208, and may be used to obtain single wall CNTs 1208. Other parameters may be used to affect the morphology of the final product as well, including reaction temperature, pressure, and feed gas flow rates.

The CO and $H_2$ react at grain boundaries 1214, lifting active catalyst particles 1216 off the catalyst bead 1202, and forming $H_2O$ 1218 and the solid carbon of the CNTs 1208. The CNTs 1208 break off from the catalyst bead 1202 and from the catalyst particle 1210. Larger catalyst particles 1210 can be captured and returned to the reactor, for example, by the catalyst separator 518 discussed with respect to FIG. 5, or by catalyst separation zones in the reactor designs discussed with respect to FIGS. 6-11. Very fine catalyst particles 1210 will be carried out with the CNTs 1208. The final product will include about 95 mol % solid carbon and the balance from the catalyst materials, including, for example, iron. The CNTs 1208 will often agglomerate to form clusters 1220, which are the common form of the final product. Some amount of the CO and $H_2$ passes through the reactor without reacting and are contaminants in the reactor effluent streams.

As the reaction proceeds, the catalyst bead 1202 is degraded and finally consumed. Accordingly, the catalytic reaction 1200 can be described as a metal dusting reaction. In some embodiments, metal surfaces are protected from attack by a ceramic lining, since the metal surfaces in contact with the reaction conditions would not only degrade, but may also result in the formation of poorer quality products.

The catalyst bead 1202 can include any number of other metals, such as nickel, ruthenium, cobalt, molybedenum, and others, including non-reactive metals such as copper, tin, or aluminum, among others. However, the catalytic sites on the catalyst beads 1202 are principally composed of iron atoms. In one embodiment, the catalyst bead 1202 includes metal shot, for example, about 120-25 mesh (0.125 mm to 0.710 mm) metal beads that are used for shot blasting. In one embodiment, the catalyst may be a stainless ball bearing, and the like.

Gas Separation System

Figure 13:
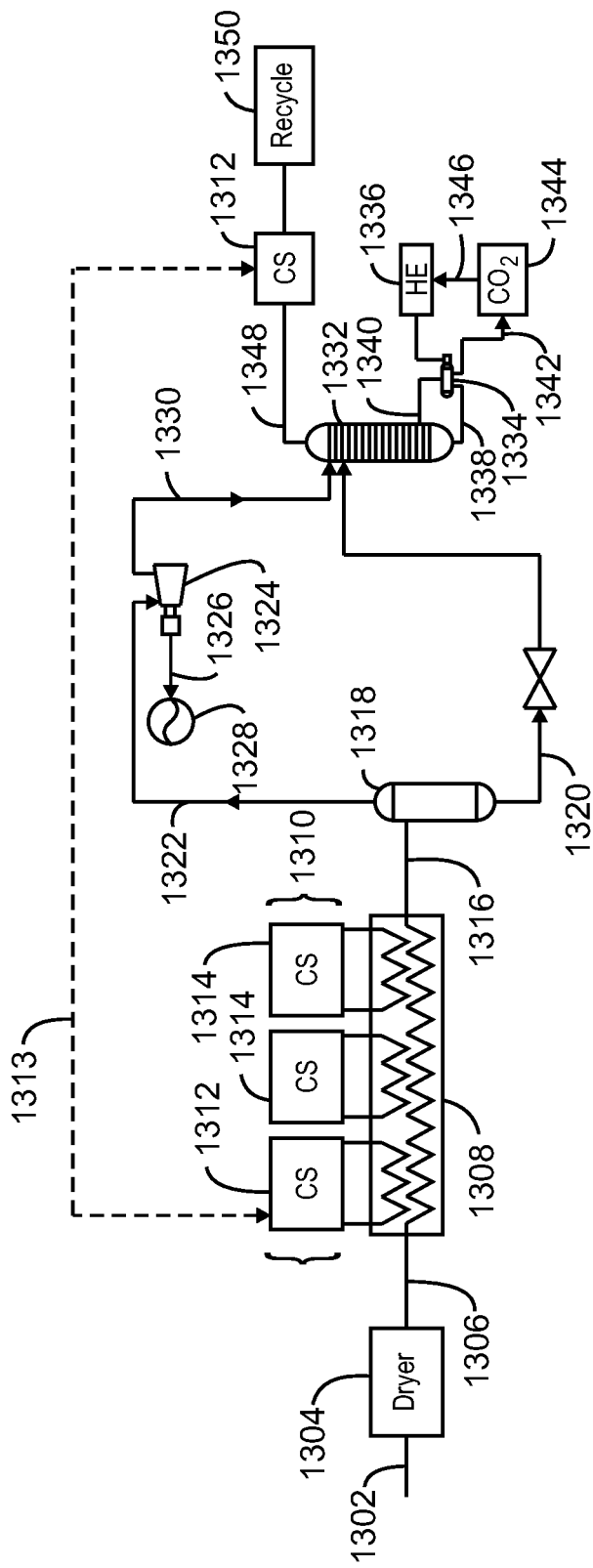
FIG. 13 is a simplified process flow diagram of a gas separation process that can be used to separate excess carbon dioxide from a recycle gas in a reactor system for the production of carbon allotropes.

FIG. 13 is a simplified process flow diagram of a gas separation system 1300 that can be used in a reactor system for the production of carbon allotropes. The gas separation system 1300 is a bulk fractionation process that may be used with a high $CO_2$ reactor system, such as that discussed with respect to FIG. 4. However, other technologies may be used in embodiments described herein, such as gas adsorption/desorption separation systems.

In the gas separation system 1300, the feed gas 1302 is fed to a dryer 1304 to reduce the dew point to about −40° C. (about −40° F.), about −50° C. (about −58° F.), about −56.7° C. (about −70° F.), about −60° C. (about −76° F.), about −70° C. (about −94° F.), about −80° C. (about −112° F.), or lower. The feed gas 1302 can correspond to the dried gas stream 366 discussed with respect to FIGS. 3 and 4. The dryer 1304 can be a fixed or fluidized dryer bed, containing an adsorbent, such as molecular sieves, desiccants, and the like. Other dryer technologies may also be used, such as cryogenic drier systems. Referring also to FIG. 3, in some embodiments, the dryer can be located prior to the compressor 338, which may eliminate the need for the ambient temperature heat exchanger 332.

The dry gas feed 1306 is then fed through a cryogenic chiller 1308 to reduce the temperature in preparation for the separation. As $CO_2$ will condense from the gas at about −61° C. (about −77° F.), a multistage chilling system 1310 may be used to reduce the temperature to around this level. The multistage chilling system 1310 may include a heat recovery system, chiller system 1312, used to heat the outlet gas with energy 1313 from the dry feed gas 1306.

The chilled feed 1316 is fed to a separation vessel 1318 to separate a liquid stream 1320 and a vapor stream 1322. The vapor stream 1322 is passed through an expander 1324 to lower the temperature by generating mechanical work 1326 in an adiabatic expansion process. In one embodiment, the mechanical work 1326 is used to drive a generator 1328, which may provide a portion of the electricity used in the plant. In another embodiment, the mechanical work 1326 is used to drive a compressor, for example, for compressing a refrigerant stream for the multistage chilling system 1310. The expansion can result in a two phase stream 1330.

The liquid stream 1320 and the two phase stream 1330 are fed to a separation column 1332, for example, at different points along the separation column 1332. Heat is supplied to the separation column 1332 by a reboiler 1334. The reboiler 1334 is heated by a stream from a heat exchanger 1336. The heat exchanger 1336 may be part of a chiller system that is warmer than the separation column 1332, although well below ambient temperature. The column bottom stream 1338 is passed through the reboiler 1334 and a portion 1340 is reinjected after being warmed. An outlet stream 1342 from the reboiler 1334 provides the $CO_2$ product 1344. A portion 1346 of the $CO_2$ product 1344 may be recycled through the heat exchanger 1336 to carry energy to the reboiler 1334.

The overhead stream 1348 from the separation column 1332 is a methane enhanced stream, for example, including about 55 mol % $CH_4$ and about 40 mol % $CO_2$, about 60 mol % $CH_4$ and about 35 mol % $CO_2$, about 70 mol % $CH_4$ and about 25 mol % $CO_2$, about 73 mol % $CH_4$ and about 23 mol % $CO_2$, or about 80 mol % $CH_4$ and about 15 mol % $CO_2$. As noted, the overhead stream 1348 may be used in a chiller system 1312 to cool the dry gas feed 1306, warming the overhead stream 1348 to form the recycle gas 1350. Other components may be present in the recycle gas 1350 including, for example, about 1 mol % CO and $H_2$, about 2 mol % CO and $H_2$, about 3.5 mol % CO and $H_2$, about 4 mol % CO and $H_2$, or about 5 mol % CO and $H_2$.

The configurations and units discussed with respect to FIG. 13 are merely exemplary. Any number of variations may be made to these systems. Further, other gas separation systems may be used in embodiments, so long as flow rates and purity levels can be achieved.

Packaging System

Figure 14:
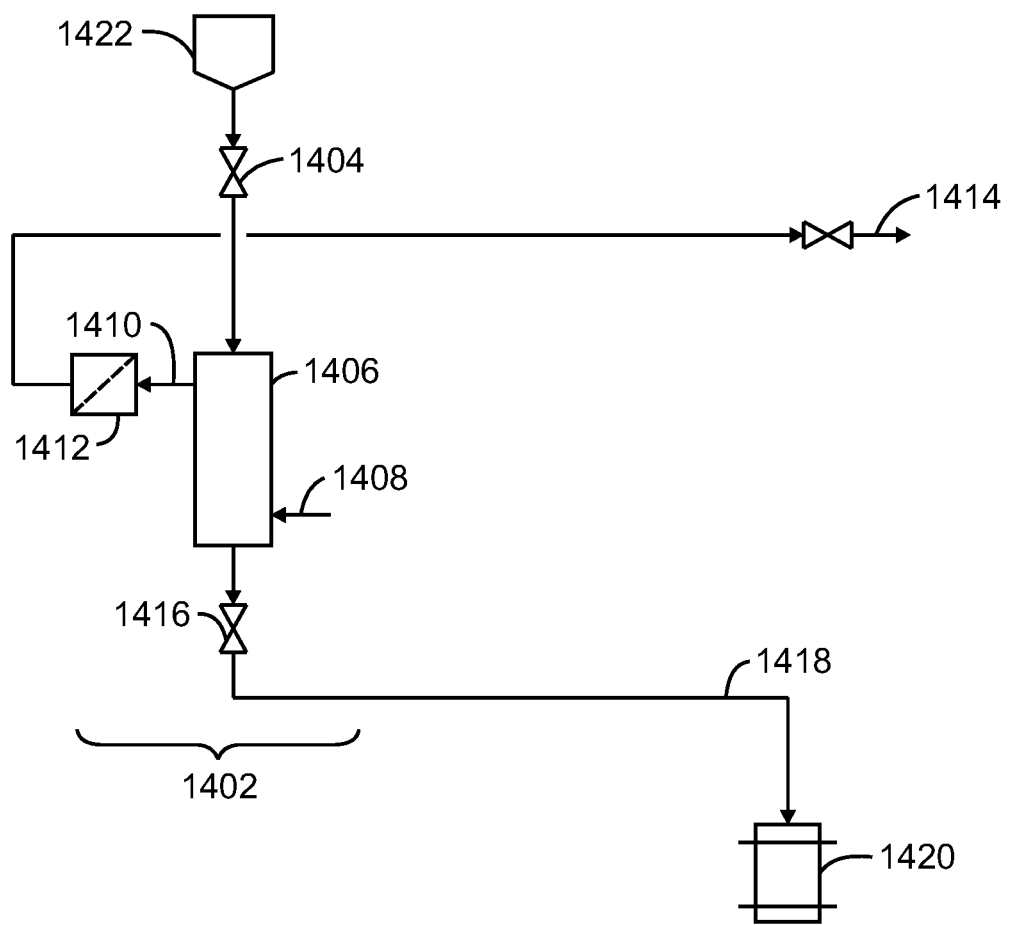
FIG. 14 is a simplified process flow diagram of a packaging system that can package carbon allotropes separated from a reactor effluent stream from a one reactor system.

FIG. 14 is a simplified process flow diagram of a packaging system 1400 that can package carbon allotropes 324 separated from an effluent stream from a reactor system. The packaging system 1400 overlaps the lock hopper 422 of the separation system 418 shown in FIG. 4, and is used to isolate the carbon allotropes from the process for packaging.

The packaging system 1400 is part of a packaging train 1402. The packaging train 1402 may have a sampling valve 1404 to remove carbon allotropes from the lock hopper 422. The sampling valve 1404 may be a rotary valve configured to allow a certain amount of carbon allotropes and gas through during a portion of a rotation cycle. In some embodiments, the sampling valve 1404 may be a ball valve or gate valve configured to open fully for a selected period of time to allow a selected amount of carbon allotropes and gas through, prior to closing fully. The carbon allotropes and gas are allowed to flow into a drum 1406 for purging and cooling.

After the sampling valve 1404 has closed, a purge stream 1408 may be opened into the drum 1406 to sweep out remaining gases, such as CO, $H_2$, $H_2O$, and $CH_4$. As noted, the purge stream 1408 may be taken from the $CO_2$ enriched side of the gas separation system, for example, as purge gas stream 430, discussed with respect to FIG. 4. The purge outlet stream 1410 will carry some amount of carbon allotropes, and other fine particles, and may be passed through a filter 1412, prior to being sent back to the process as a purge return 1414. The filter 1412 may be a bag filter, cyclonic separator, or any other suitable separation system. After purging is completed, a packaging valve 1416 will open to allow a stream 1418 including carbon allotropes to flow to a filling station 1420 to be packaged in drums or tanks for sale.

The isolation system described above is merely exemplary. Any number of other systems may be used in embodiments. However, the carbon allotropes, such as CNTs, may have a very low density, of less than about 0.5 g/cc depending on morphological distribution, and may best be packaged in a system configured to isolate them from the atmosphere to lower the amount lost to the plant environment.

Method

Figure 15:
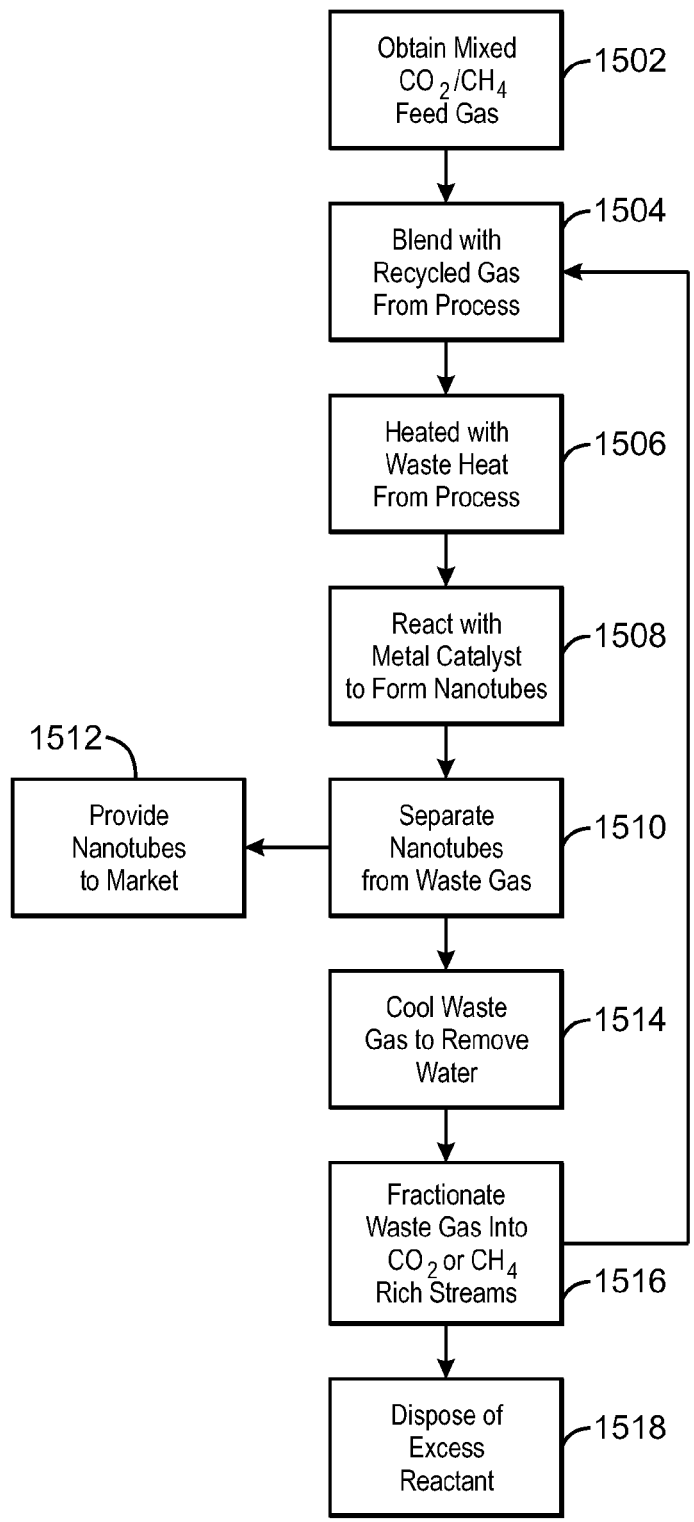
FIG. 15 is a method for generating carbon allotropes from a feed gas that includes methane and carbon dioxide.

FIG. 15 is a method 1500 for generating carbon allotropes, such as CNTs, from a feed gas that includes methane and carbon dioxide. Although the method is described for CNTs, it can be understood to apply to other carbon allotropes. The method 1500 begins at block 1502, at which a mixed $CO_2/CH_4$ feedstock is obtained. The feed stock may be obtained from any number of sources. As mentioned, the feedstock may include a natural gas harvested from a sub-surface reservoir, an exhaust gas from a power generation plant, or any number of other gases from natural or plant sources, or industrial operations. Further, other feedstocks may be used in embodiments, including other materials, such as syngas, CO, $H_2$, other hydrocarbons, and the like.

At block 1504, the feedstock is combined with a recycle gas obtained from the waste gases generated in the process. As described herein, the recycle gas may be obtained from the waste gases by cryogenic gas fractionation, as well as any number of other techniques. At block 1506, the combined gas stream is heated with waste heat recovered from the reaction process. After heating, at block 1508, the combined gas stream is reacted with a metal catalyst in a hybrid reactor to form the CNTs. At block 1510, the CNTs are separated from the waste gas. At block 1512, the separated CNTs are purged, cooled, and packaged to be sent to market.

The waste gas is cooled to remove excess water formed during the reaction. As the process is conducted at high temperatures and pressures, an ambient temperature heat exchanger provides sufficient cooling to condense out the water vapor. The processes described at blocks 1506-1514 will be repeated for each sequential reactor in the reaction system.

At block 1516, the waste gas is separated into a $CO_2$ enriched stream and a $CH_4$ enriched stream. At block 1518, whichever stream contains the excess reagent can be sold, while the other stream can be recycled to block 1504 to be used in the process.

Still other embodiments of the claimed subject matter may include any combinations of the elements listed in the following numbered paragraphs:

1. A reactor system for the production of carbon allotropes, including a hybrid reactor configured to form carbon allotropes from a reactant gas mixture in a Bosch reaction, wherein the hybrid reactor includes at least two distinct zones that perform different functions including reaction, attrition, catalyst separation, or gas separation.

2. The system of paragraph 1, wherein the hybrid reactor includes:
   a first zone including a fluidized bed disposed in a narrow portion of a reactor vessel; and
   a second zone including an expanded area bed disposed in a wider portion of the reactor vessel, wherein a reactant gas stream in the reactor flows from the narrow fluidized bed to the wider fluidized bed.

3. The system of paragraph 2, wherein the expanded area bed is configured to slow the reactant gas stream to allow catalyst particles to fall back into the fluidized bed.

4. The system of any of paragraphs 1, 2, or 3, wherein the hybrid reactor includes:
   a first zone including a fluidized bed reactor; and
   a second zone including a transport reactor, wherein the transport reactor is configured to circulated a portion of the material from the fluidized bed reactor to an opposite end of the fluidized bed reactor.

5. The system of paragraph 4, including dividing a reactant gas stream into portions, wherein a first portion of the reactant gas stream is injected into the fluidized bed to maintain fluidization, and a second portion of the reactant gas stream is injected into the transport reactor to push material through the transport reactor.

6. The system of any of the proceeding paragraphs, wherein the hybrid reactor includes:
   a first zone including a packed bed; and
   a second zone including an expanded bed area, wherein a reactant gas stream flows through the packed bed before flowing through the expanded bed area.

7. The system of paragraph 6, wherein the reactant gas stream is intermittently pulsed to fluidize the packed bed.

8. The system of paragraphs 6 or 7, wherein the expanded area bed is configured to slow the reactant gas stream to allow catalyst particles to fall back into the packed bed.

9. The system of any of the proceeding paragraphs, wherein the hybrid reactor includes:
   a first zone including a spouted bed;
   a second zone including a disengaging section configured to allow catalyst particles to drop back to the spouted bed; and
   a third zone including an expanded bed area, wherein the expanded bed area is configured to slow a reactant gas flow and allow smaller particles to fall back to the spouted bed.

10. The system of any of the proceeding paragraphs, wherein the hybrid reactor includes:
    a first zone including a packed bed disposed in an outer annulus of the hybrid reactor; and
    a second zone including a fluidized bed disposed in an inner annulus of the hybrid reactor.

11. The system of paragraph 10, wherein a reactant gas flows through the packed bed and then into the fluidized bed.

12. The system of either of paragraphs 10 or 11, wherein a material in the packed bed flows out of the bottom of the hybrid reactor into a high velocity stream of reactant gas, and wherein the high velocity stream of reactant gas recirculates the material to the top of the hybrid reactor.

13. The system of either of paragraphs 10, 11, or 12, wherein fresh catalyst is fed into the high velocity stream of reactant gas.

14. The system of any of the proceeding paragraphs, wherein the hybrid reactor includes:
    a first reactor including:
       a first zone including a packed bed; and
       a second zone including a separation zone, wherein the separation zone is configured to remove a gas from the packed bed; and
    a second reactor including a third zone including a fluidized bed, wherein material from the packed bed of the first reactor flows into the fluidized bed of the second reactor.

15. The system of paragraph 14, wherein the fluidized bed attrits carbon allotropes from the material.

16. The system of any of the proceeding paragraphs, including a catalyst separation cyclone configured to remove catalyst particles from an effluent stream from the hybrid reactor and return the catalyst particles to the hybrid reactor.

17. The system of any of the proceeding paragraphs, including a fresh catalyst feed system configured to provide fresh catalyst to a reaction zone in the hybrid reactor.

18. The system of any of the proceeding paragraphs, including a spent catalyst removal system configured to remove material from a reaction zone.

19. The system of any of the proceeding paragraphs, including a product separation cyclone configured to remove a carbon allotrope from an effluent stream.

20. The system of any of the proceeding paragraphs, including at least two product separation cyclones in a series configuration, wherein each product separation cyclone configured to remove a carbon allotrope from an effluent stream.

21. A method for forming carbon allotropes, including:
  injecting a reactant gas into a hybrid reactor, wherein the hybrid reactor includes at least two zones, and wherein each zone performs a function including reaction, catalyst separation, attrition, or gas separation, and wherein the reactant gas includes a carbon oxide and a hydrocarbon;
  forming carbon allotropes in the hybrid reactor using a Bosch reaction;
  separating catalyst particles from the reactant gas to form a waste gas stream; and
  separating the carbon allotropes from the waste gas stream.

22. The method of paragraph 21, including forming the carbon allotropes in a packed bed.

23. The method of either of paragraphs 21 or 22, including attriting carbon allotropes from a catalyst particle in a fluidized bed.

24. The method of any of paragraphs 21, 22, or 23, including separating a catalyst particle from the reactant gas in an expanded bed area.

25. The method of any of paragraphs 21-24, including forming the carbon allotropes in a transport reactor.

26. A reaction system for forming carbon allotropes, including:
  a hybrid reactor configured to form carbon allotropes from gas streams using a Bosch reaction, wherein the hybrid reactor includes at least two distinct functional zones, wherein each zone is configured to perform a function including reaction, attrition, catalyst separation, or gas separation;
  a separation system downstream of the hybrid reactor, wherein the separation system is configured to remove carbon allotropes from an effluent from the hybrid reactor;
  a feed heater downstream of the separation system, wherein the feed heater includes a heat exchanger configured to heat a feed gas stream for the hybrid reactor using waste heat from the effluent from the hybrid reactor;
  a heat exchanger downstream of the separation system, wherein the heat exchanger is configured to remove water from the effluent;
  a gas separation system configured to separate the reactant depleted waste stream into a methane enriched stream and a carbon dioxide enriched stream; and
  a mixer configured to blend the methane enriched stream or the carbon dioxide enriched stream into an initial feed stream.

27. The reaction system of paragraph 26, wherein a reactor zone includes a fluidized bed, and wherein the fluidized bed attrits carbon allotropes from a catalyst surface.

28. The reaction system of either of paragraphs 26 or 27, wherein a reactor zone includes a packed bed, wherein the packed bed forms carbon allotropes on a catalyst surface.

29. The reaction system of any of paragraphs 26, 27, or 28, wherein a reactor zone includes an expanded bed area, wherein the expanded bed area slows a gas stream allowing entrained particles to settle out of the gas stream.

30. The reaction system of any of paragraphs 26-29, including a separation vessel downstream of the ambient temperature heat exchanger, wherein the separation vessel is configured to separate liquid water from a gas stream.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A reactor system for the production of carbon allotropes, comprising:
  a hybrid reactor configured to form carbon allotropes from a reactant gas mixture in a Bosch reaction, wherein the hybrid reactor comprises at least two distinct zones that perform different functions comprising reaction, attrition, catalyst separation, or gas separation, comprising a first zone comprising a fluidized bed reactor to form carbon allotropes, and a second zone comprising a transport reactor to form carbon allotropes and circulate a portion of material from the fluidized bed reactor to an opposite end of the fluidized bed reactor, wherein the reactor system is to divide a reactant gas stream into portions comprising a first portion to be injected into the fluidized bed reactor to maintain fluidization, and a second portion to be injected into the transport reactor to push material through the transport reactor, wherein a growth time of carbon allotropes in the transport reactor is controlled by a flow rate of the second portion;
  a catalyst separator to separate catalyst particles from a reactor effluent stream of the hybrid reactor; and
  a product separator to remove carbon allotropes from the reactor effluent stream.

2. The system of claim 1, wherein the fluidized bed reactor comprises:
  a fluidized bed disposed in a narrow portion of a reactor vessel, wherein the reactor system is a continuous system; and
  an expanded area bed disposed in a wider portion of the reactor vessel, wherein a reactant gas stream in the reactor flows from the fluidized bed to the expanded area, and wherein the reactor effluent stream comprises product gases.

3. The system of claim 2, wherein the expanded area bed is configured to slow the reactant gas stream to allow catalyst particles to fall back into the fluidized bed.

4. A reactor system for the production of carbon allotropes, comprising:
  a hybrid reactor to form carbon allotropes from a reactant gas mixture in a Bosch reaction, wherein the hybrid reactor comprises at least two distinct zones that perform different functions comprising reaction, attrition, catalyst separation, or gas separation, comprising a first zone comprising a packed bed disposed in an outer annulus of the hybrid reactor, and a second zone to comprise a fluidized bed disposed in an inner annulus of the hybrid reactor;
  a catalyst separator to separate catalyst particles from a reactor effluent stream of the hybrid reactor; and
  a product separator to remove carbon allotropes from the reactor effluent stream.

5. The system of claim 4, wherein a reactant gas stream is intermittently pulsed to fluidize the packed bed.

6. The system of claim 4, wherein a reactant gas flows through the packed bed and then into the fluidized bed.

7. The system of claim 4, wherein a material in the packed bed flows out of a bottom of the hybrid reactor into a high velocity stream of reactant gas, and wherein the high velocity stream of reactant gas recirculates the material to a top of the hybrid reactor.

8. The system of claim 6, wherein fresh catalyst is fed into a high velocity stream of reactant gas.

9. A reactor system for the production of carbon allotropes, comprising:
   a hybrid reactor configured to form carbon allotropes from a reactant gas mixture in a Bosch reaction, wherein the hybrid reactor comprises at least two distinct zones that perform different functions comprising reaction, attrition, catalyst separation, or gas separation, wherein the hybrid reactor comprises:
      a first reactor comprising:
         a first zone comprising a packed bed; and
         a second zone comprising a separation zone, wherein the separation zone is configured to remove a gas from the packed bed; and
      a second reactor comprising a third zone to comprise a fluidized bed, wherein material from the packed bed of the first reactor flows into the fluidized bed of the second reactor;
   a catalyst separator to separate catalyst particles from a reactor effluent stream of the hybrid reactor; and
   a product separator to remove carbon allotropes from the reactor effluent stream.

10. The system of claim 9, wherein the fluidized bed attrits carbon allotropes from the material.

11. The system of claim 1, wherein the reactor system is a continuous system, and wherein the catalyst separator comprises a catalyst separation cyclone configured to remove the catalyst particles from the reactor effluent stream and discharge as return the catalyst particles to the hybrid reactor.

12. The system of claim 1, comprising a fresh catalyst feed system configured to provide fresh catalyst to a reaction zone in the hybrid reactor.

13. The system of claim 1, comprising a spent catalyst removal system configured to remove material from a reaction zone.

14. The system of claim 1, wherein the product separator comprises a product separation cyclone disposed downstream of the catalyst separator and configured to remove carbon allotropes from the reactor effluent stream, and wherein the hybrid reactor is a continuous reactor.

15. A reactor system for the production of carbon allotropes, comprising:
   a hybrid reactor configured to form carbon allotropes from a reactant gas mixture in a Bosch reaction, wherein the hybrid reactor comprises at least two distinct zones that perform different functions comprising reaction, attrition, catalyst separation, or gas separation;
   a catalyst separator to separate catalyst particles from a reactor effluent stream of the hybrid reactor; and
   a product separator to remove carbon allotropes from the reactor effluent stream, wherein the product separator comprises at least two product separation cyclones in a series configuration, wherein each product separation cyclone configured to remove carbon allotropes from the reactor effluent stream.

16. A method for forming carbon allotropes, comprising:
   injecting a reactant gas into a hybrid reactor, wherein the hybrid reactor comprises at least two distinct zones that perform different functions comprising reaction, catalyst separation, attrition, or gas separation, and wherein the reactant gas comprises a carbon oxide and a hydrocarbon;
   forming carbon allotropes from a reactant gas mixture comprising the reactant gas in the hybrid reactor in a Bosch reaction;
   separating, via a catalyst separator, catalyst particles from from a reactor effluent stream of the hybrid reactor; and
   removing, via a product separator, the carbon allotropes from the reactor effluent stream, wherein the product separator comprises at least two product separation cyclones in a series configuration, wherein each product separation cyclone removes carbon allotropes from the reactor effluent stream.

17. The method of claim 16, comprising forming the carbon allotropes in a packed bed in the hybrid reactor.

18. The method of claim 16, comprising attriting carbon allotropes from a catalyst particle in a fluidized bed in the hybrid reactor, wherein the hybrid reactor is a continuous reactor.

19. The method of claim 16, comprising separating catalyst particles from the reactant gas comprising separating a catalyst particle from the reactant gas in an expanded bed area of the hybrid reactor.

20. The method of claim 16, wherein the at least two zones comprise a first zone comprising a fluidized bed reactor and a second zone comprising a transport reactor, wherein forming carbon allotropes in the hybrid reactor comprises forming the carbon allotropes in the transport reactor, and wherein the transport reactor comprises a plug flow reactor.

21. A reaction system for forming carbon allotropes, comprising:
   a hybrid reactor configured to form carbon allotropes from gas streams using a Bosch reaction, wherein the hybrid reactor comprises at least two distinct functional zones, wherein each zone is configured to perform a function comprising reaction, attrition, catalyst separation, or gas separation;
   a separation system downstream of the hybrid reactor, wherein the separation system is configured to remove carbon allotropes from an effluent from the hybrid reactor;
   a feed heater downstream of the separation system, wherein the feed heater comprises a heat exchanger configured to heat a feed gas stream for the hybrid reactor using waste heat from the effluent from the hybrid reactor;
   an ambient temperature heat exchanger downstream of the separation system, wherein the ambient temperature heat exchanger is configured to remove water from the effluent giving a cooled waste stream;
   a gas separation system configured to separate the cooled waste stream into a methane enriched stream and a carbon dioxide enriched stream; and
   a mixer configured to blend the methane enriched stream or the carbon dioxide enriched stream into an initial feed stream.

22. The reaction system of claim 21, wherein the reaction system comprises a continuous system, wherein the at least two distinct functional zones comprise a reactor zone comprising a fluidized bed, wherein the fluidized bed attrits carbon allotropes from a catalyst surface, wherein the separation system removing carbon allotropes from the effluent forms a waste gas stream, and wherein the feed heater is to cross-exchange the feed gas stream with the waste gas stream to heat the feed gas stream.

23. The reaction system of claim 21, wherein a reactor zone comprises a packed bed, wherein the packed bed forms carbon allotropes on a catalyst surface.

24. The reaction system of claim 21, wherein a reactor zone comprises an expanded bed area, wherein the expanded bed area slows a gas stream allowing entrained particles to settle out of the gas stream.

25. The reaction system of claim 21, comprising:
a catalyst separator configured to separate catalyst from the effluent, wherein the reaction system is a continuous system; and
a separation vessel downstream of the ambient temperature heat exchanger, wherein the separation vessel is configured to separate liquid water from the effluent to facilitate giving the cooled waste stream.

* * * * *